(12) United States Patent
Pinson et al.

(10) Patent No.: US 7,182,822 B2
(45) Date of Patent: Feb. 27, 2007

(54) METAL MATERIAL WITH MODIFIED SURFACE, PREPARATION METHOD AND USE OF SAME

(75) Inventors: Jean Pinson, Fontenay Sous Bois (FR); Olivier Fagebaume, Paris (FR); Fetah Podvorica, Fontenay Sous Bois (FR)

(73) Assignee: Universite Paris 7-Denis Diderot, Paris Cedex (FR)

( * ) Notice: Subject to any disclaimer, the term of this patent is extended or adjusted under 35 U.S.C. 154(b) by 338 days.

(21) Appl. No.: 10/203,376

(22) PCT Filed: Feb. 9, 2001

(86) PCT No.: PCT/FR01/00388

§ 371 (c)(1),
(2), (4) Date: Nov. 25, 2002

(87) PCT Pub. No.: WO01/59178

PCT Pub. Date: Aug. 16, 2001

(65) Prior Publication Data

US 2003/0162039 A1    Aug. 28, 2003

(30) Foreign Application Priority Data

Feb. 11, 2000 (FR) .................................. 00 01716

(51) Int. Cl.
*C23C 22/48* (2006.01)
*C23C 8/06* (2006.01)
*B32B 7/04* (2006.01)
*B32B 15/07* (2006.01)

(52) U.S. Cl. ...................... 148/241; 148/269; 148/281; 148/282; 428/420; 428/457

(58) Field of Classification Search ............. 428/420, 428/457; 148/241, 269, 281, 282
See application file for complete search history.

(56) References Cited

U.S. PATENT DOCUMENTS

| | | | |
|---|---|---|---|
| 3,293,075 A | 12/1966 | Wildi | 136/86 |
| 3,615,889 A | 10/1971 | Rauch | 148/6.14 R |
| 3,852,256 A * | 12/1974 | Parker et al. | 525/327.3 |
| 5,554,739 A * | 9/1996 | Belmont | 534/885 |

FOREIGN PATENT DOCUMENTS

| | | |
|---|---|---|
| EP | 0 061 986 | 10/1982 |
| EP | 0165649 | 12/1985 |
| EP | 0 814 644 A1 | 12/1997 |
| FR | 645 095 | 10/1928 |
| FR | 1 412 137 A | 1/1966 |
| FR | 2 761 377 | 10/1998 |
| GB | 2 336 378 A | 10/1999 |
| WO | WO 88/05473 | 7/1988 |
| WO | WO 92/13983 | 8/1992 |
| WO | 88/05473 * | 7/1998 |

OTHER PUBLICATIONS

Alberg, Elisabet; Helgee, Bertil; Parker, Vernon D. "The reaction of aryl radicals with metallic electrodes" Acta Chemica Scandinavica, Series B: Organic Chemistry and Biochemistry (1980) p. 181-6.*

* cited by examiner

*Primary Examiner*—Carol Chaney
*Assistant Examiner*—Kevin R. Kruer
(74) *Attorney, Agent, or Firm*—Young & Thompson

(57) ABSTRACT

A metal material whose surface is modified by bonding of aromatic groups, optionally substituted by functional groups.

24 Claims, 26 Drawing Sheets

Figure 6:
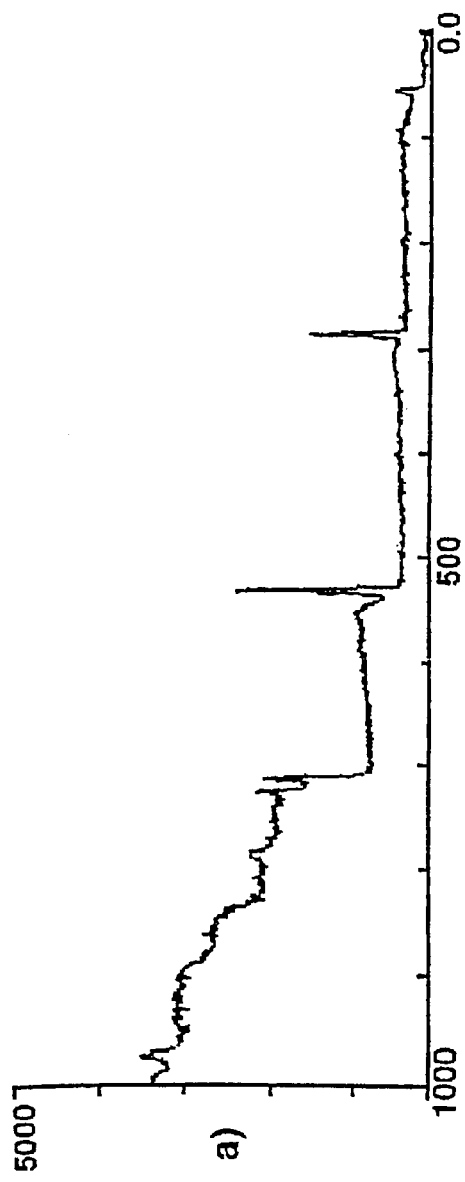
Figure 6:
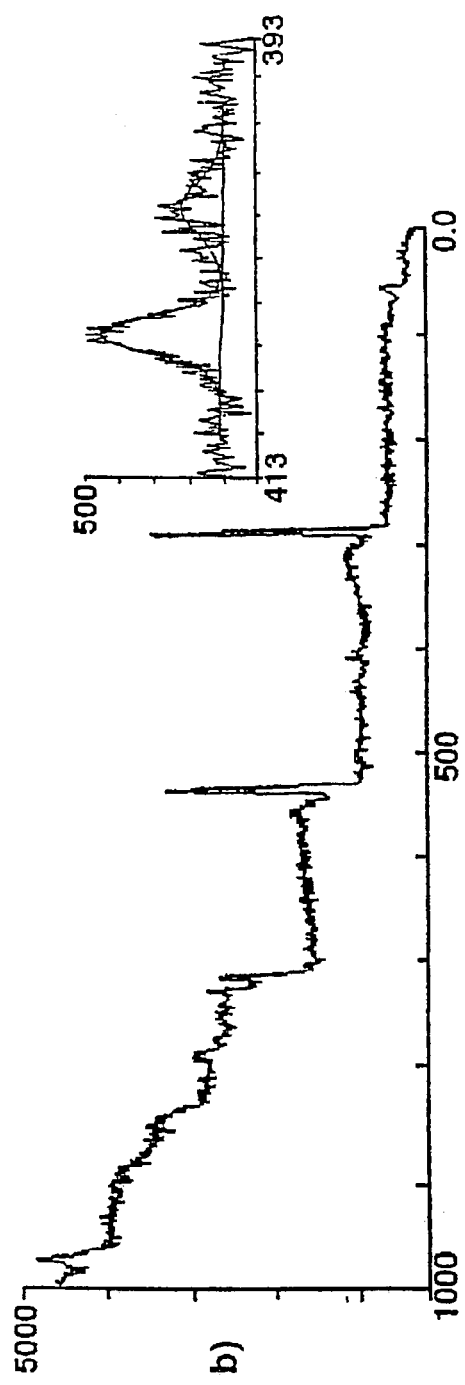

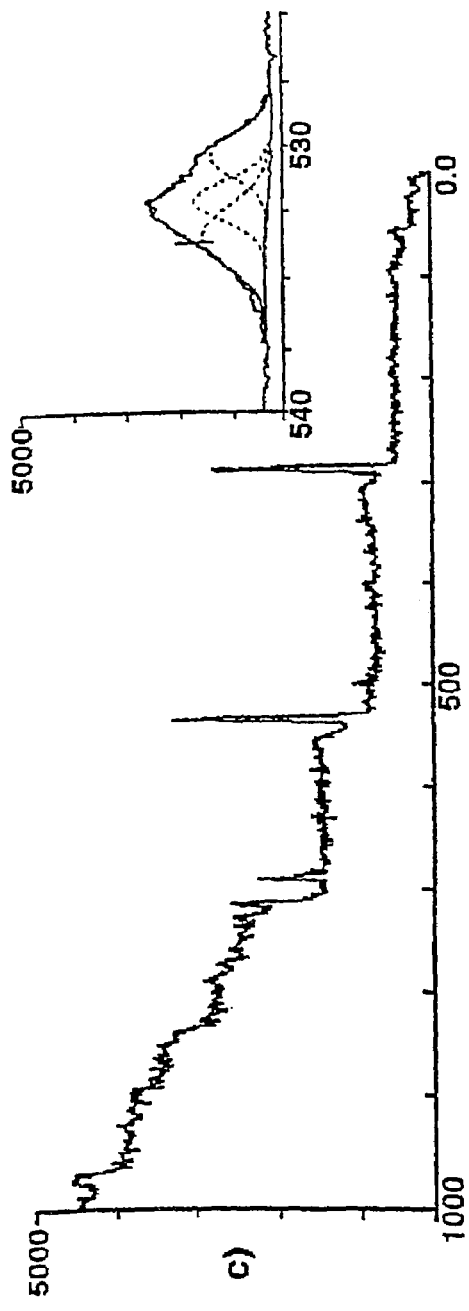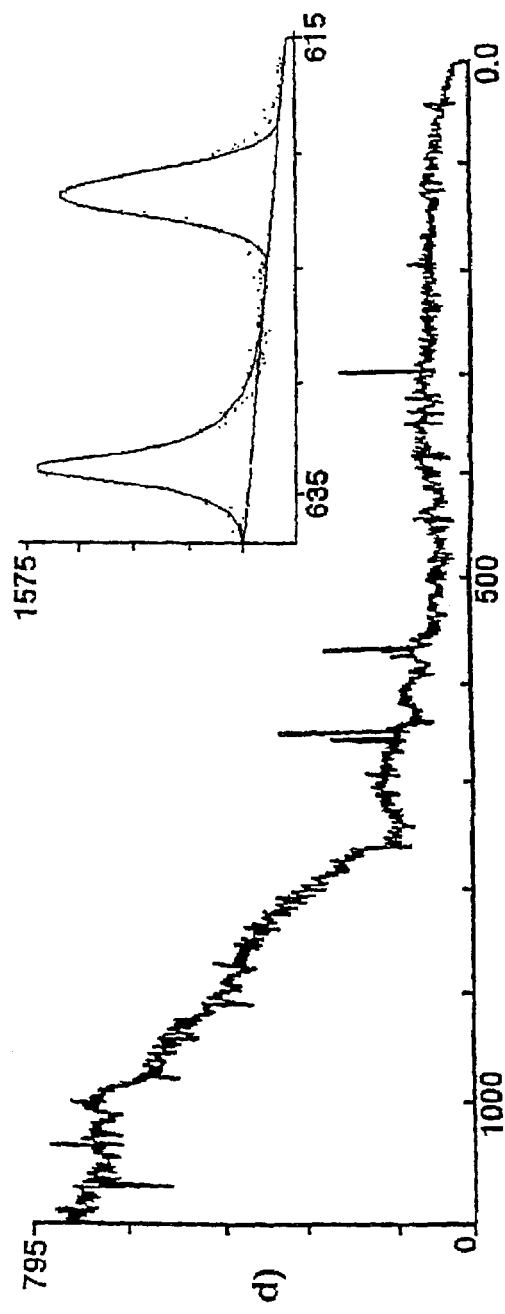
Figure 6 c
Figure 6 d

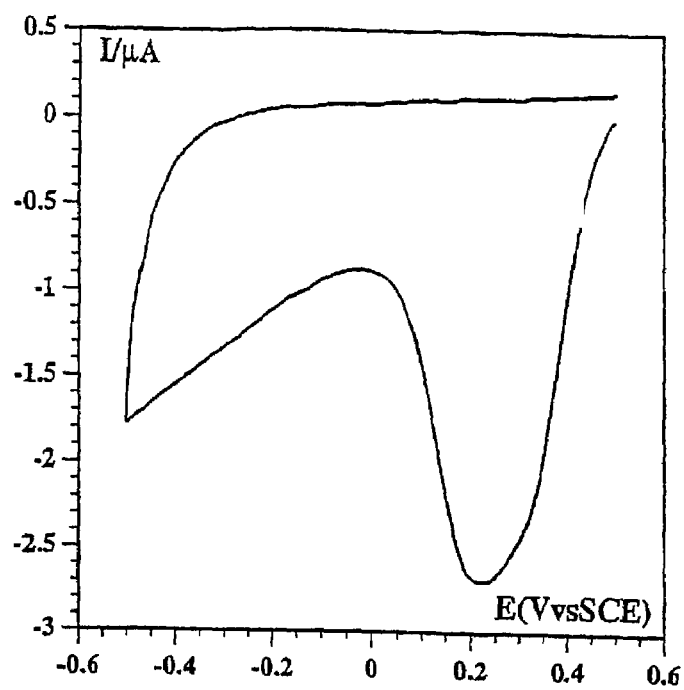
Figure 14 a
Figure 14 b
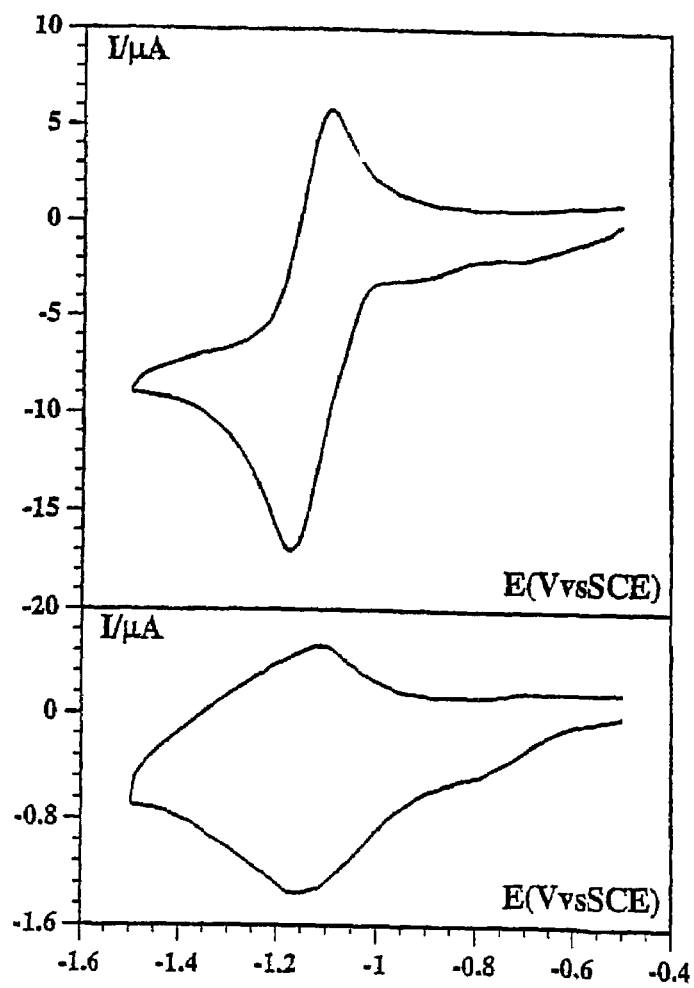
Figure 14 c

Electrode de fer de diamètre 1 mm
Référence ECS

X : 100 mV/cm
Y : 5 µA/cm v = 100 mV/s

Electrode de fer de diamètre 1 mm
Référence ECS

X : 100 mV/cm
Y : 0,8 µA/cm v = 100 mV/s

Electrode de fer de diamètre 1 mm
Référence ECS

X : 100 mV/cm
Y : 0,8 µA/cm v = 100 mV/s

X : 100 mV/cm
Y : 0,8 µA/cm v = 100 mV/s

Electrode de fer de diamètre 1 mm
Référence ECS

Electrode de fer de diamètre 1 mm
Référence ECS

X : 100 mV/cm
Y : 0,8 µA/cm v = 100 mV/s

Electrode de fer de diamètre 1 mm
Référence ECS v = 300 mV/s

X : 100 mV/cm
Y : 0,8 µA/cm

METAL MATERIAL WITH MODIFIED SURFACE, PREPARATION METHOD AND USE OF SAME

The invention relates to a metallic material, the surface of which is modified, its preparation method and the use of the modified material.

It has already been shown that the electrochemical reduction of diazonium salts on a carbon electrode makes it possible to attach aryl groups covalently to the carbon surface.[1] This chemical reaction can be carried out not only in an aprotic medium in acetonitrile, but also in an aqueous acid medium.

The monolayers obtained with a great variety of diazonium salts have been characterized by various methods: cyclic voltammetry, photoelectron spectroscopy (XPS), vibration spectroscopy (PMIRRAS—Polarization Modulation InfraRed Reflexion Absorption Spectroscopy—and Raman spectroscopy [2]), and Rutherford backscattering spectroscopy (RBS). Grafting occurs on the pendant bonds of the vitreous carbon, but also on the base plane of the Highly Oriented Pyrolytic Graphite (HOPG) (i.e. on $sp^2$ carbons). On the basis of the well-known reduction of aryl halides,[3] this grafting reaction is attributed to the very reactive aryl radical produced during the electrochemical reduction of diazonium salts. The effect of these grafted organic layers on the rate of electron transfer has been measured.[4] These organic monolayers have been used for attaching redox enzymes[7b] for limiting the adsorption of proteins,[5] for differentiating dopamine from ascorbic acid in electrochemical assays,[6] and for checking vitreous carbon flux detectors[7] The simple chemical reaction of the diazonium salts (without electrochemistry) has made it possible to attach aryl groups to carbon blacks to produce materials for use in the plastics, rubber and textiles industry.[8] It is also possible to obtain compact layers of aryl groups on silicon by electrochemical reduction of diazonium salts on hydrogenated silicon Si (111).[9]

Up to now, grafting of aromatic groups on the surface of metallic material has not been carried out.

The invention relates in particular to the grafting of aromatic groups on the surface of metallic material.

The invention relates in particular to grafting that is stable over time, of aromatic groups on the surface of a metallic material.

In one of its generalities, the invention relates to a metallic material whose surface is modified by bonding aromatic groups to the said surface, optionally substituted by functional groups.

It was found, unexpectedly, that it was possible to form stable metal-carbon bonds, the said carbon being inserted in an aromatic group.

By "aromatic group" is meant a radical derived from a cyclic compound having one or more independent or condensed benzene rings, and/or one or more complex rings derived from benzene. This radical can of course also contain heterocyclic rings and/or various substituents as well as hydrocarbon chains optionally containing heteroatoms such as N, O and S.

The expression "metallic material whose surface is modified by bonding of aromatic groups to the said surface" means that a layer that can have a minimum thickness of about 10 Å, i.e. is a monolayer, is grafted on the surface of the metallic material.

In general, the layers grafted on the surface of the metallic material according to the invention have a thickness varying from about 10 Å to about 1 mm.

The expression "aromatic groups optionally substituted by functional groups" means that the grafted aromatic groups can undergo subsequent chemical transformations, as will become evident in the course of the description that follows.

In the metallic material according to the invention, the nature of the bond between the surface and the aromatic groups modifying it is a carbon-metal bond of the covalent type, and in particular is such that it withstands ultrasonic cleaning.

The expression "carbon-metal of the covalent type" means a strong non-ionic bond obtained by overlapping of the orbitals of the carbon and of the metal.

The conditions of resistance of the carbon-metal bond to ultrasonic cleaning are described by way of illustration, in the examples given later.

According to an advantageous embodiment, in the metallic material according to the invention, the aromatic group is a $C_6$–$C_{14}$ aromatic residue, optionally substituted by one or more functional substituents or a heteroaromatic residue of 4 to 14 atoms, optionally substituted by one or more functional substituents, having one or more heteroatoms selected from oxygen, nitrogen, sulphur or phosphorus.

According to another embodiment, in the metallic material according to the invention, the aromatic group contains one or more substituents selected from the group comprising:

linear or branched aliphatic radicals of 1 to 20 carbon atoms, optionally containing one or more double or triple bonds, optionally substituted by the following radicals: carboxyl, $NO_2$, disubstituted protected amino, monosubstituted protected amino, cyano, diazonium, alkoxy of 1 to 20 carbon atoms, alkoxycarbonyl of 1 to 20 carbon atoms, alkylcarbonyloxy of 1 to 20 carbon atoms, vinyl optionally fluorinated or allyl, halogen atoms, aryl radicals optionally substituted by the radicals carboxyl, $NO_2$, disubstituted protected amino, monosubstituted protected amino, cyano, diazonium, alkoxy of 1 to 20 carbon atoms, alkoxycarbonyl of 1 to 20 carbon atoms, alkylcarbonyloxy of 1 to 20 carbon atoms, vinyl optionally fluorinated or allyl, halogen atoms, the following radicals: carboxyl, $NO_2$, disubstituted protected amino, monosubstituted protected amino, cyano, diazonium, alkoxy of 1 to 20 carbon atoms, alkoxycarbonyl of 1 to 20 carbon atoms, alkylcarbonyloxy of 1 to 20 carbon atoms, vinyl optionally fluorinated, halogen atoms.

According to another embodiment, the metallic material according to the invention is such that the aromatic group contains one or more substituents capable of reacting directly with a substrate, or one or more precursor substituents which, after transformation, are capable of reacting with a substrate, the said substrate being selected from the group comprising organic resins, biological molecules, chemical molecules or complexing agents.

According to another embodiment, the metallic material according to the invention is such that the aromatic group contains one or more substituents capable of reacting directly with an organic resin and selected from the group comprising allyl or vinyl groups, —$(CH_2)_n$—COOH, —$(CH_2)_n$—$CH_2$—OH, $(CH_2)_n$—$NH_2$, n being an integer between 0 and 10, or one or more precursor substituents capable of reacting after transformation with an organic resin and selected from the group comprising $NO_2$, $N_2^+$, $(CH_2)_n$—CN, $(CH_2)_n$—CHO, $(CH_2)_n$—COOPr, Pr being a protective group, $(CH_2)_n$—NHP'r, $(CH_2)_n$—N(P'r)$_2$, $(CH_2)_n$—N=P"r, P'r and P"r being protective groups, and n being an integer between 1 and 10.

According to another embodiment, the metallic material according to the invention is such that the aromatic group contains one or more substituents capable of reacting directly with a biological molecule and selected from the group —$(CH_2)_n$—COOH, $(CH_2)_n$—NH$_2$, n being an integer between 0 and 10, or one or more precursor substituents capable of reacting after transformation with a biological molecule and selected from the group comprising NO$_2$, N$_2^+$, $(CH_2)_n$—CN, $(CH_2)_n$—CHO, $(CH_2)_n$—COOPr, Pr being a protective group, and n being an integer between 0 and 10.

According to another embodiment, in the metallic material according to the invention, the aromatic group contains one or more substituents capable of reacting directly with functional organic molecules selected from the group comprising NO$_2$, $(CH_2)_n$—CONH$_2$, $(CH_2)_n$—CN, $(CH_2)_n$—CHO, $(CH_2)_n$—COOH, $(CH_2)_n$—CH$_2$OH, $(CH_2)_n$—NH$_2$, n being an integer between 0 and 10, SO$_2$H, SO$_3$H, SO$_2$R, SO$_3$R, R being an aliphatic or aromatic carbon chain of 1 to 20 carbon atoms, or one or more precursor substituents capable of reacting after transformation with functional organic molecules selected from the group comprising NO$_2$, $(CH_2)_n$—CONH$_2$, $(CH_2)_n$—COOPr, Pr being a protective group, $(CH_2)_n$—NHP'r, $(CH_2)_n$—N(P'r)$_2$, $(CH_2)_n$—N=P"r, P'r and P"r being protective groups, $(CH_2)_n$—CN, $(CH_2)_n$—CHO, $(CH_2)_n$—COOH, $(CH_2)_n$—CH$_2$OH, n being an integer between 0 and 10, SO$_2$Pr, SO$_3$Pr, Pr being a protective group selected from the meanings of R.

According to another embodiment of the invention, the aromatic group is selected from:

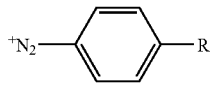

1 R = NO$_2$
2 R = I
3 R = COOH
4 R = CH$_3$
5 R = n-C$_4$H$_9$
6 R = n-C$_{12}$H$_{25}$
7 R = OC$_{12}$H$_{25}$
8 R = OC$_{16}$H$_{33}$

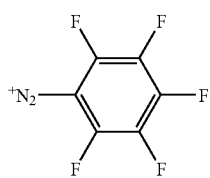

9

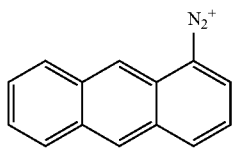

10

-continued

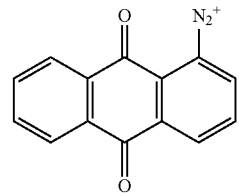

11

Hereinafter, the diazonium salts will be identified by their number, as indicated above.

The following compounds are used advantageously:

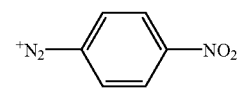

1

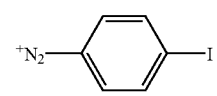

2

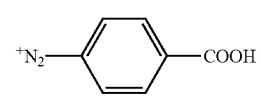

3

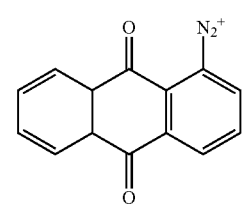

11 since their substituents can easily be characterized by cyclic voltammetry (NO$_2$, quinone), by XPS or RBS (NO$_2$, I, COOH) and PMIRRAS (NO$_2$). The other diazoniums were selected for their possible hydrophobic properties that can lead to a decrease in the rates of corrosion.

According to an advantageous embodiment of the invention, the metal is selected from pure metals or alloys, and especially iron, nickel, platinum, gold, copper, zinc, cobalt, titanium, chromium, silver, stainless steels, titanium alloys, chromium-cobalt alloys, molybdenum, manganese, vanadium.

For preparation of the metallic material according to the invention, it is possible to employ a method consisting of fixing an aromatic group on the surface of the said material, by electrochemical reduction of a diazonium salt containing this aromatic group, by placing the metallic material in contact with a solution of the diazonium salt in a solvent and negatively polarizing the metallic material relative to an anode that is also in contact with the solution of the diazonium salt, it being optionally possible for the anode and the cathode to be separated from one another, for example by a diaphragm or a membrane.

When aryl groups are grafted on carbon, carbon-carbon bonds are obtained, which are the usual bonds of organic chemistry. On vitreous carbon, bonding probably occurs on account of the pendant bonds, and on Highly Oriented Pyrolytic Graphite by transformation of an $sp^2$ carbon to an $sp^3$ carbon. As for iron-carbon or more generally metal-carbon bonds, they are far less usual and moreover nothing would suggest that the reduction of the diazonium salt on the metal of the electrode might lead to strong fixation of aromatic groups on the surface. Moreover, it is unusual to reduce organic substrates on less noble metals like iron or zinc or even copper and titanium; as for the noble metals, they are commonly employed as electrodes in molecular electrochemistry, precisely because they do not react with the substrates, the reaction intermediates or the end products. The method of the invention could not therefore be envisaged on the basis of present knowledge.

In this method, if we assume that the diazonium salt corresponds to the formula $ArN^+_2X^-$, where Ar represents the aromatic group of the diazonium salt and $X^-$ represents an anion, the electrochemical reduction of the diazonium cation $ArN^+_2$ corresponds to the following reaction scheme:

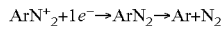

$$ArN^+_2 + 1e^- \rightarrow ArN_2 \rightarrow Ar + N_2$$

Thus, reduction of the diazonium cation releases the aromatic group from the diazonium salt in the form of a free radical that can attack the surface of the metallic material and become fixed on it.

The diazonium salts were chosen because they are more easily reducible than the radical to which they give rise. According to the invention, it is therefore necessary for the reduction potential of the diazonium salt used to be less negative than the reduction potential of the free radical $Ar^-$ corresponding to the aromatic group of the said diazonium salt.

In fact, if the reduction potential of the diazonium salt was more negative than the reduction potential of the radical $Ar^{31}$, the free radical $Ar^-$ would be reduced to $Ar^-$ during electrochemical reduction of the diazonium salt and $Ar^-$ would be protonated either by residual water, or by the solvent itself to form ArH, without fixing itself to the metallic material.

This latter condition concerning the reduction potential of the diazonium salt is fulfilled for nearly all the diazonium salts.

According to one embodiment of the invention, the anode and the cathode are not separated.

In this case the anode and the cathode are immersed in the solution containing the diazonium salt. Two electrodes are sufficient for working in intentiostatic mode. A reference electrode must be added, immersed in the same solution, if working in potentiostatic mode.

According to yet another embodiment, the anode and cathode are separated, for example by a diaphragm or a membrane.

In this case, just two electrodes are required when working in intentiostatic mode. If working in potentiostatic mode it is necessary to add a reference electrode in the cathode compartment.

The invention also relates to a method in which electrochemical reduction takes place in the presence of an electrolyte, the anode and cathode compartments optionally being separated, with the anode compartment containing the solvent and the electrolyte, and the cathode compartment containing the solvent, the electrolyte and the diazonium salt.

Electrochemical reduction can take place in the presence of an electrolyte.

According to this configuration, the anode and the cathode need not to be separated.

Both are immersed in the solution. Two electrodes are sufficient in intentiostatic mode. A reference electrode must be added in potentiostatic mode.

According to another embodiment of the invention, the anode and the cathode can be separated, by a membrane or a diaphragm. Two electrodes are sufficient in intentiostatic mode. In potentiostatic mode, on the other hand, it is necessary to add a reference electrode in the cathode compartment.

According to an advantageous embodiment, in the method according to the invention, the diazonium salt corresponds to the formula $ArN_2^+ X^-$, in which Ar represents the aromatic group and X represents an anion and in that the diazonium salt has a reduction potential that is less negative than the reduction potential of the free radical $Ar°$ corresponding to the aromatic group of the diazonium salt, the $X^-$ anion of the diazonium salt being selected advantageously from the halogens, the sulphates, the phosphates, the perchlorates, the tetrafluoroborates, the carboxylates, and the hexafluorophosphates.

According to another embodiment, in the method according to the invention, reduction is carried out by repetitive cyclic voltammetry in a potential range in which the diazonium salts are reduced either by electrolysis at a potential that is more negative than the reduction potential of the diazonium salt, or at constant current (intentiostatic mode).

When reduction of the diazonium salt is carried out by repetitive cyclic voltammetry in a potential range in which the diazonium salts are reduced Successive scans are carried out between a potential that is less negative than the reduction wave of the diazonium salt and a potential that is more negative than the reduction wave.

When reduction of the diazonium salt is carried out at a potential that is more negative than the reduction potential of the diazonium salt The potential of the cathode is then positioned at the level of the reduction wave of the diazonium salt or at a potential that is more negative than the potential of the reduction wave of the diazonium salt. When reduction is carried out in intentiostatic mode, the electrolysis current is set to a value such that only the diazonium salt is reduced.

According to another embodiment, in the method according to the invention the concentration of diazonium salts is between $10^{-3}$ and $10^{-1}$ mol/l.

According to another embodiment, in the method according to the invention for producing, by electrochemical means, a metallic material whose surface is modified by aromatic aminated groups, the aromatic diazonium salt is substituted by a nitro radical and electrochemical reduction is maintained until there is reduction of the nitro radical to amino radical in an aqueous acid medium.

According to another embodiment, in the method according to the invention, electrochemical reduction of the diazonium salt takes place in an aprotic solvent, in particular selected from the group comprising acetonitrile, dimethylformamide, dimethylsulphoxide and benzonitrile.

According to another embodiment, in the method according to the invention, the solution of the diazonium salt contains a supporting electrolyte consisting of a quaternary ammonium salt or a lithium salt, especially a tetraalkylammonium tetrafluoborate.

In the method according to the invention, electrochemical reduction of the organic diazonium salt can take place in a protic solvent in an acid medium.

According to another embodiment of the invention, the protic solvent is selected, from the group comprising water, methanol, ethanol or mixtures thereof, or in that the protic solvent is mixed with an aprotic solvent, it being understood that the resulting mixture has the characteristics of a protic solvent.

According to another embodiment, in the method according to the invention, the acid is selected from sulphuric, hydrochloric, nitric, nitrous, phosphoric or tetrafluoroboric acids.

In the method according to the invention, according to another advantageous embodiment, the pH of the solution is less than 2.

The invention also relates to a metallic material as obtained by implementation of the method described above.

The metallic material according to the invention can be characterized by the fact that the bond between its surface and the aromatic groups modifying it is such that when an anode sweep is carried out starting from the corrosion potential of the metal forming the surface of the metallic material, there is at least one potential responsible for the dissolution of a detectable quantity of the aforesaid metal but which does not disrupt the aforesaid bond.

The metallic material according to the invention can also be characterized by the fact that the nature of the bond between its surface and the aromatic groups modifying it is such that when an anode sweep is applied ranging from the corrosion potential to a more anodic potential of about 75 mV, to the metallic material whose surface is modified, rupture of the aforesaid bond does not occur, but there is dissolution of a detectable quantity of the metal forming the surface of the metallic material.

The diazonium salt is either prepared separately and prior to its addition, in a reactor, with a view to modification of the surface of the metallic material, or it is prepared in situ, by bringing together, in a reactor, the components necessary for its formation, according to the standard methods of the prior art.

The invention also relates to any use of the metallic materials defined above and in particular the following uses:

1-Protection of metals against corrosion either by layers obtained directly or by polymer layers obtained from polymerizable substituents, for example:

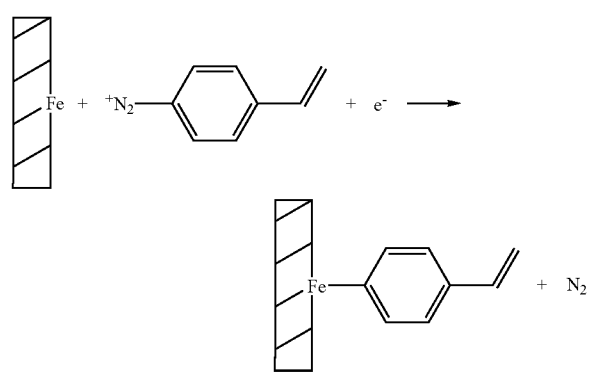

-continued

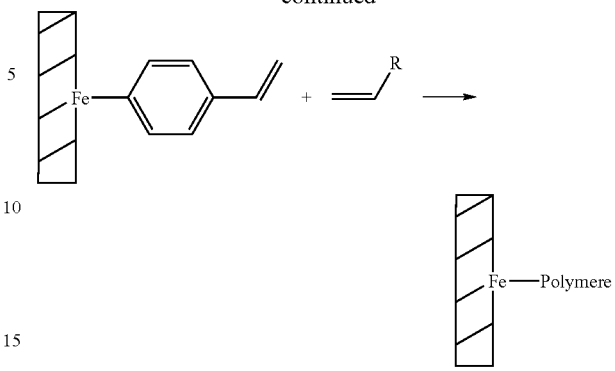

2-Lubrication by placing, on the metallic surface, molecules that improve the friction properties (e.g. perfluorinated molecules) or molecules possessing great affinity for the lubricant (e.g. long alkane chains with affinity for mineral oils and greases)

3-Adhesion of two metallic surfaces, each being modified by the above method, it being possible for the R and R' groups to react chemically with one another.

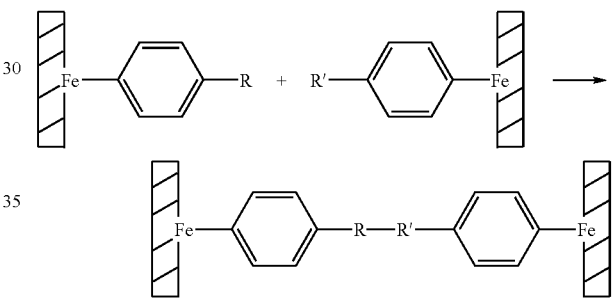

4-Improvement of biomaterials by covering the metallic surface (titanium, titanium alloys, stainless steel, chromium-cobalt alloys) for example with:

chains of the polyethyleneglycol type replacing the aromatic ring that would prevent the adhesion of proteins;

proteins such as bone morphogenic protein, which is able to stimulate bone growth;

antibiotics replacing the aromatic group to form bactericidal surfaces.

FIGURE CAPTIONS

Figure 1:
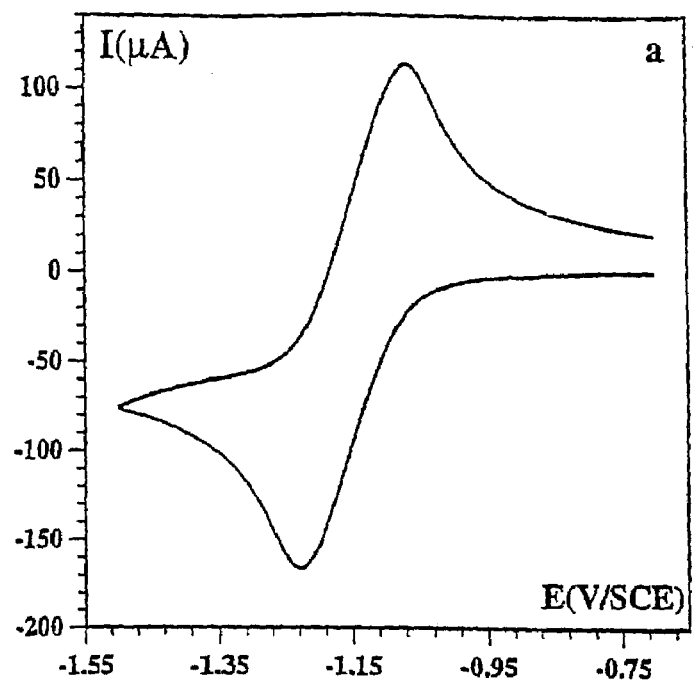
Figure 1:
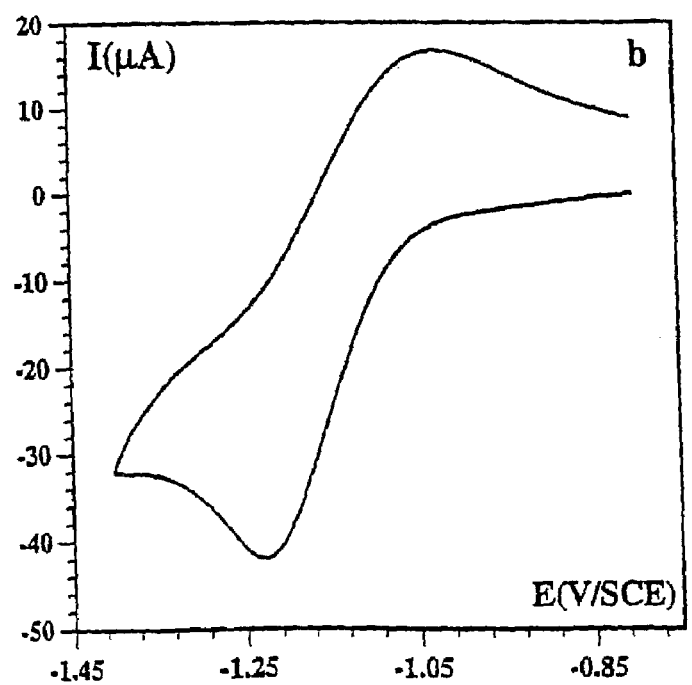
Figure 1:
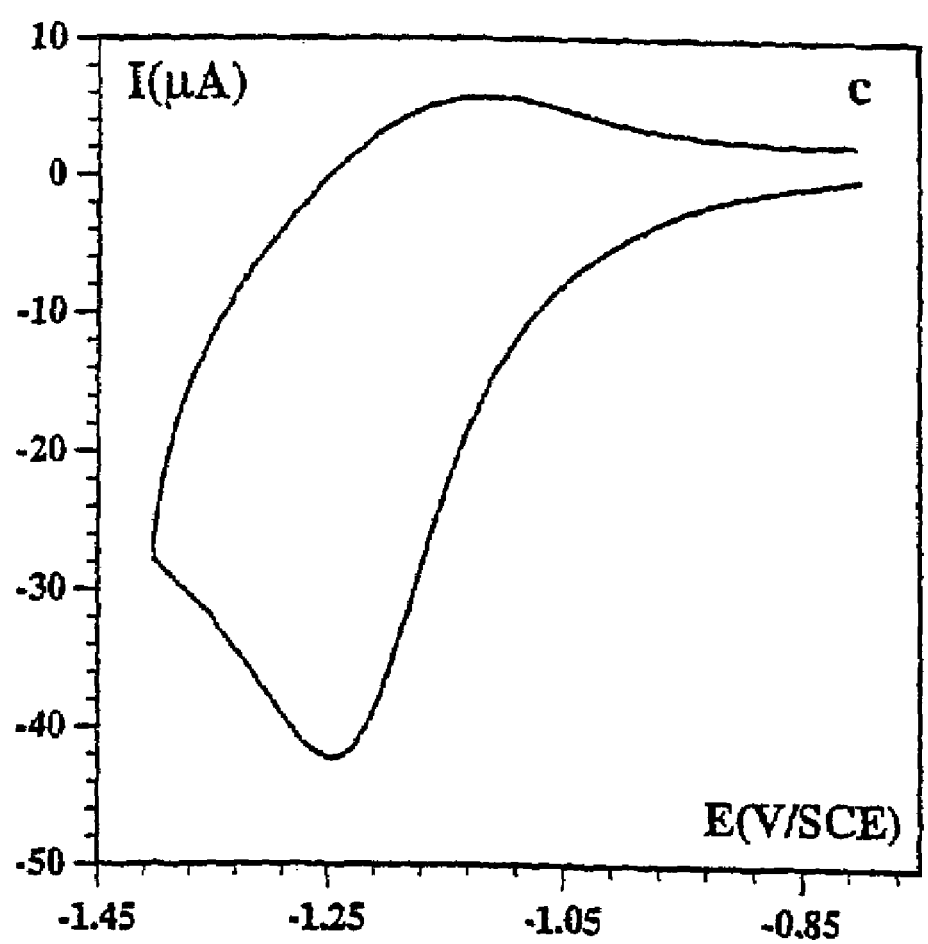

In what follows, the abbreviations have the following meanings:

SCE: saturated calomel electrode
d: electrode diameter
v: sweep rate
ACN: acetonitrile
c: concentration
$Z_{Im}$: imaginary part of the impedance
$Z_{Re}$: real part of the impedance FIGS. 1a, 1b, 1c. Cyclic voltammogram in ACN+0.1 M $NBu_4BF_4$ a) of nitrobenzene (concentration=2 mM) on a vitreous carbon electrode, b) on an iron electrode and c) of an iron electrode modified by 4-nitrophenyl groups, v=0.2 V/s. Reference SCE.

Figure 2:
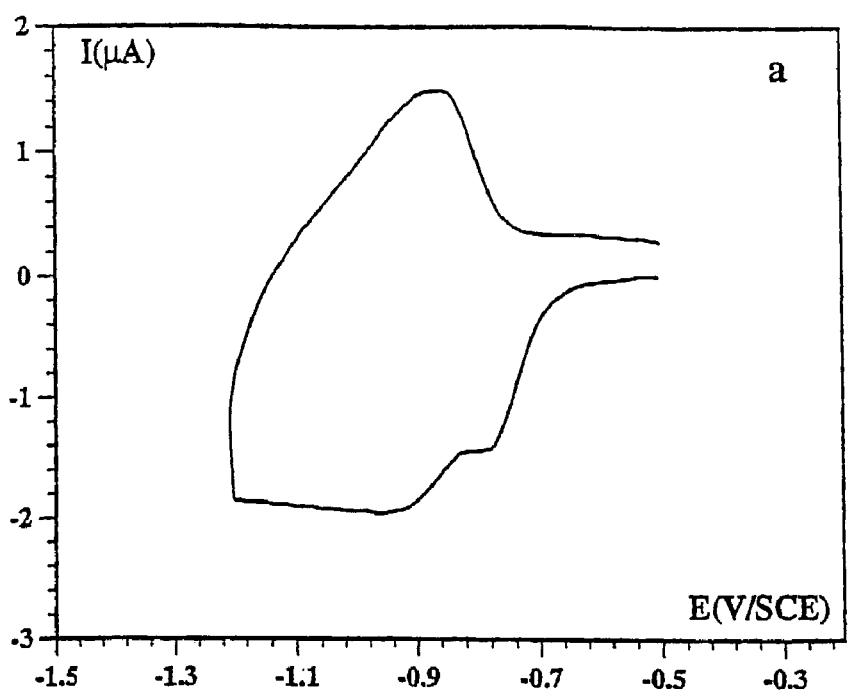
Figure 2:
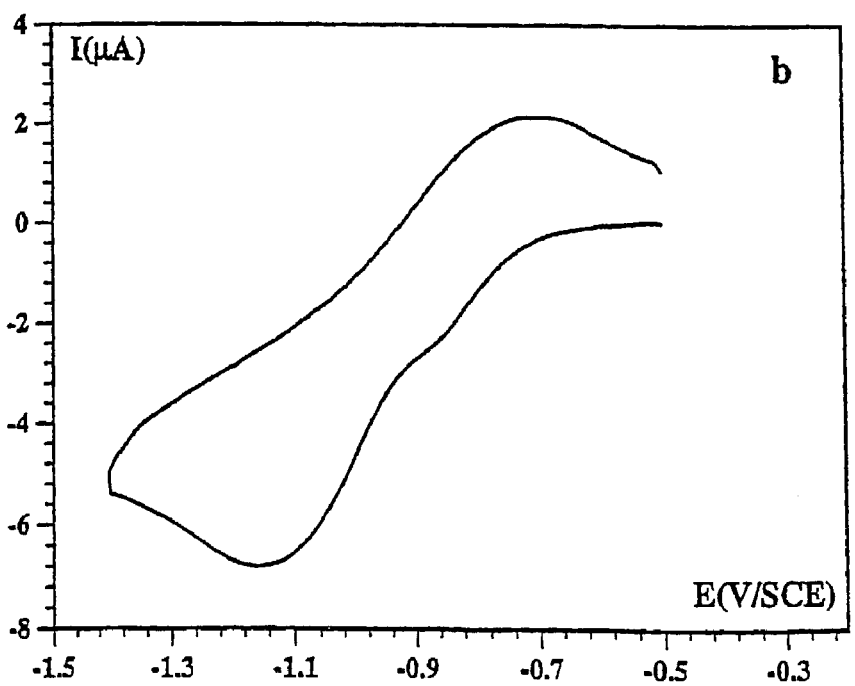

FIGS. 2a, 2b. Cyclic voltammogram of a) an iron electrode modified by anthraquinone groups and transferred to a solution ACN+0.1 M NBu$_4$BF$_4$ and b) an iron electrode in a solution ACN+0.1 M NBu$_4$BF$_4$+3 mM anthraquinone. v=0.2 V/s. Reference SCE.

Figure 3:
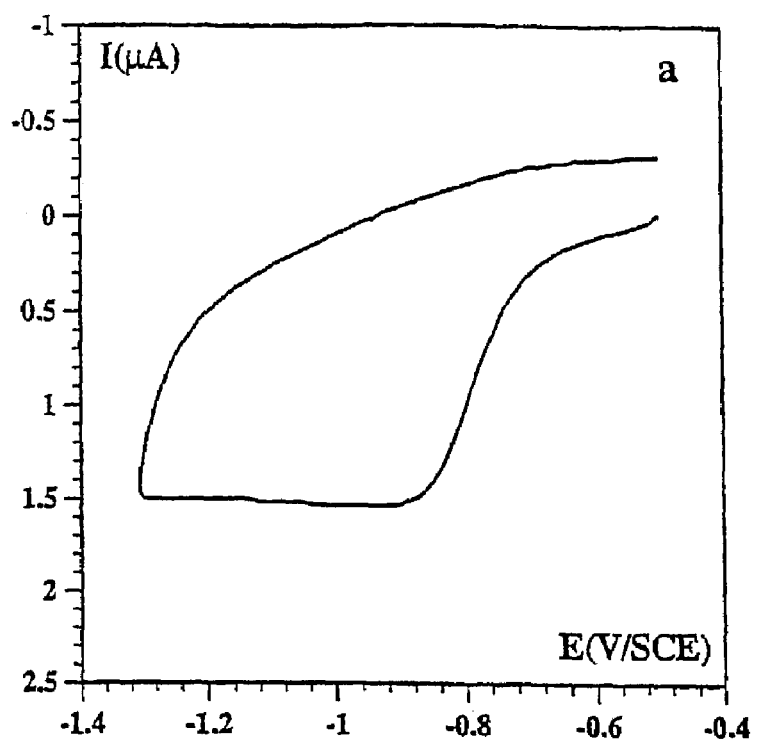
Figure 3:
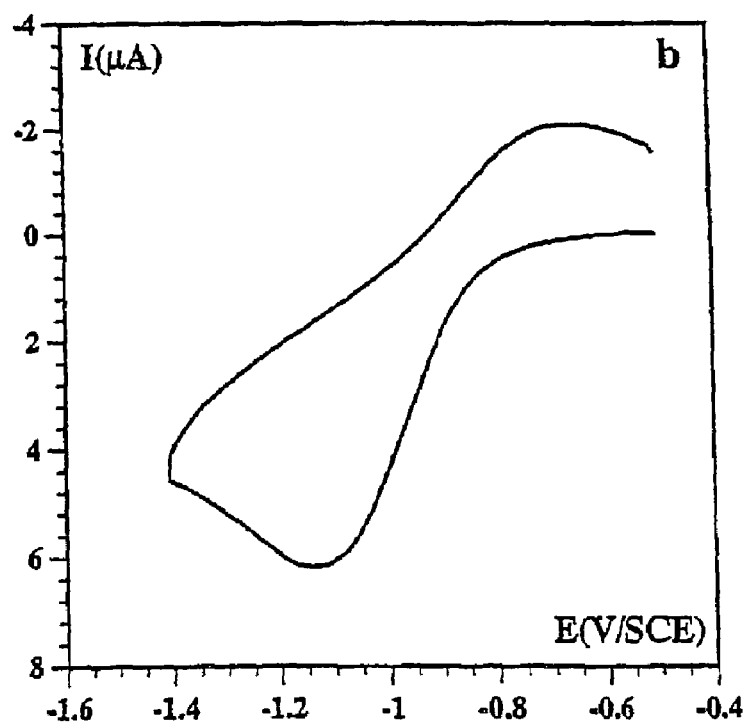

FIGS. 3a, 3b. Cyclic voltammograms in a solution ACN+ 0.1 M NBu$_4$BF$_4$ on an iron electrode of d=3 mm a) that has been modified by anthraquinone groups in 0.1N H$_2$SO$_4$ and b) in a 2 mM solution of anthraquinone (the electrode was immersed beforehand for five minutes in 0.1N H$_2$SO$_4$ then rinsed).

Figure 4:
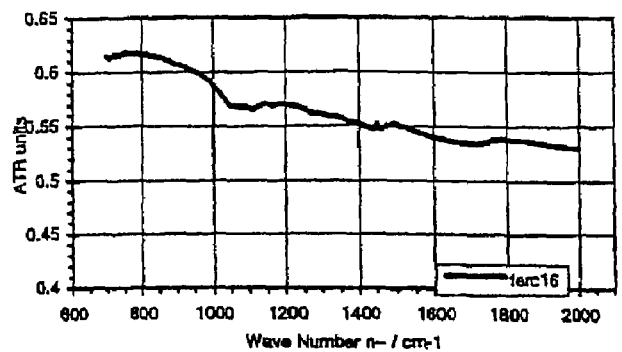
Figure 4:
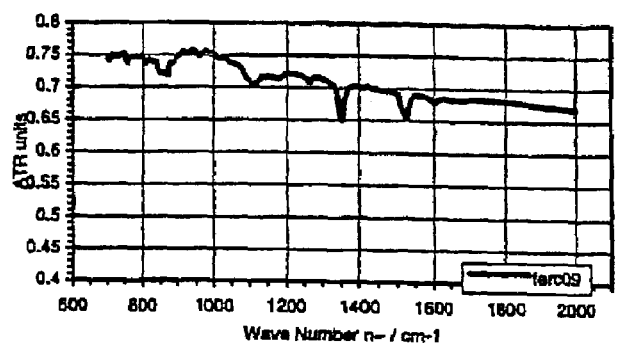
Figure 4:
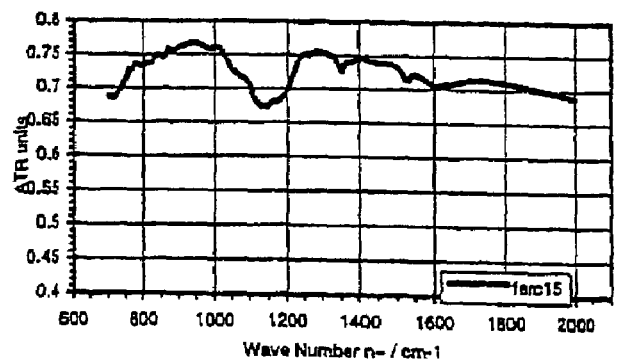

FIGS. 4a, 4b, 4c. PMIRRAS spectra of plates of mild steel a) polished, b) modified in ACN by 4-nitrophenyl groups and c) modified in 0.1N H$_2$SO$_4$ by 4-nitrophenyl groups.

Figure 5:
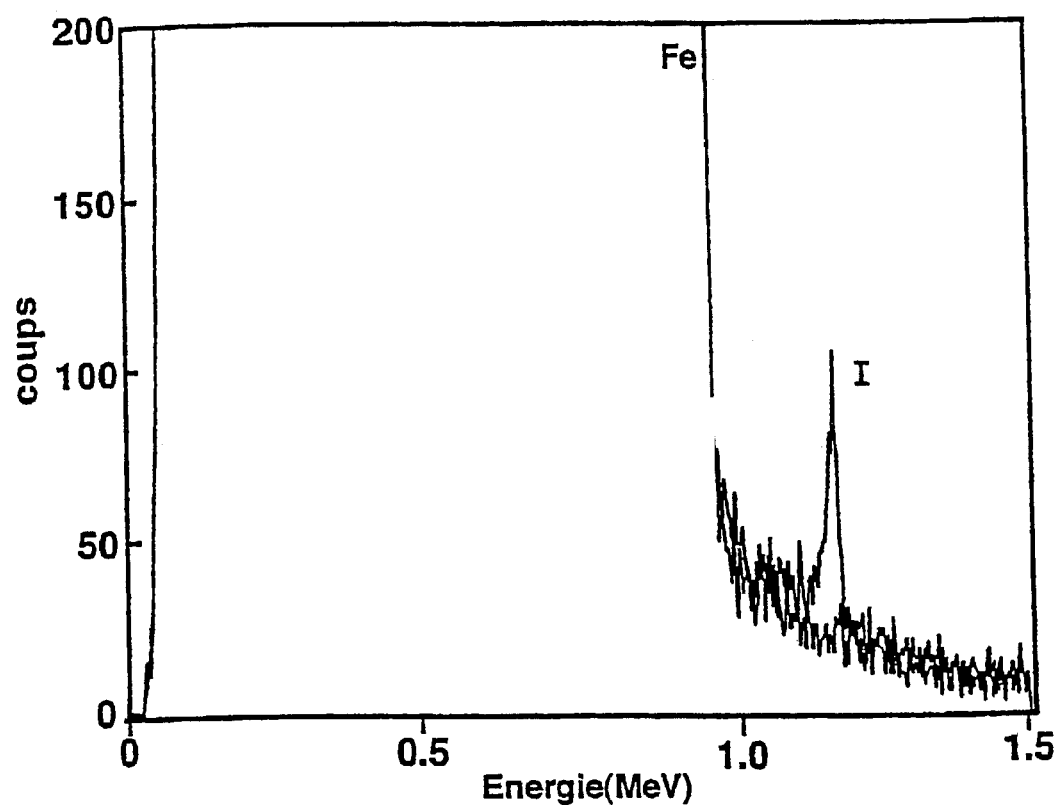

FIG. 5. RBS spectrum of a plate of mild steel modified (in ACN+0.1 M NBu$_4$BF$_4$) by 4-iodophenyl groups.

FIGS. 6a, 6b, 6c, 6d. XPS spectra of: a) a clean plate of mild steel, b) a mild steel plate grafted with 4-nitrophenyl groups, c) with 4-carboxyphenyl groups and d) with 4-iodophenyl groups.

Figure 7:
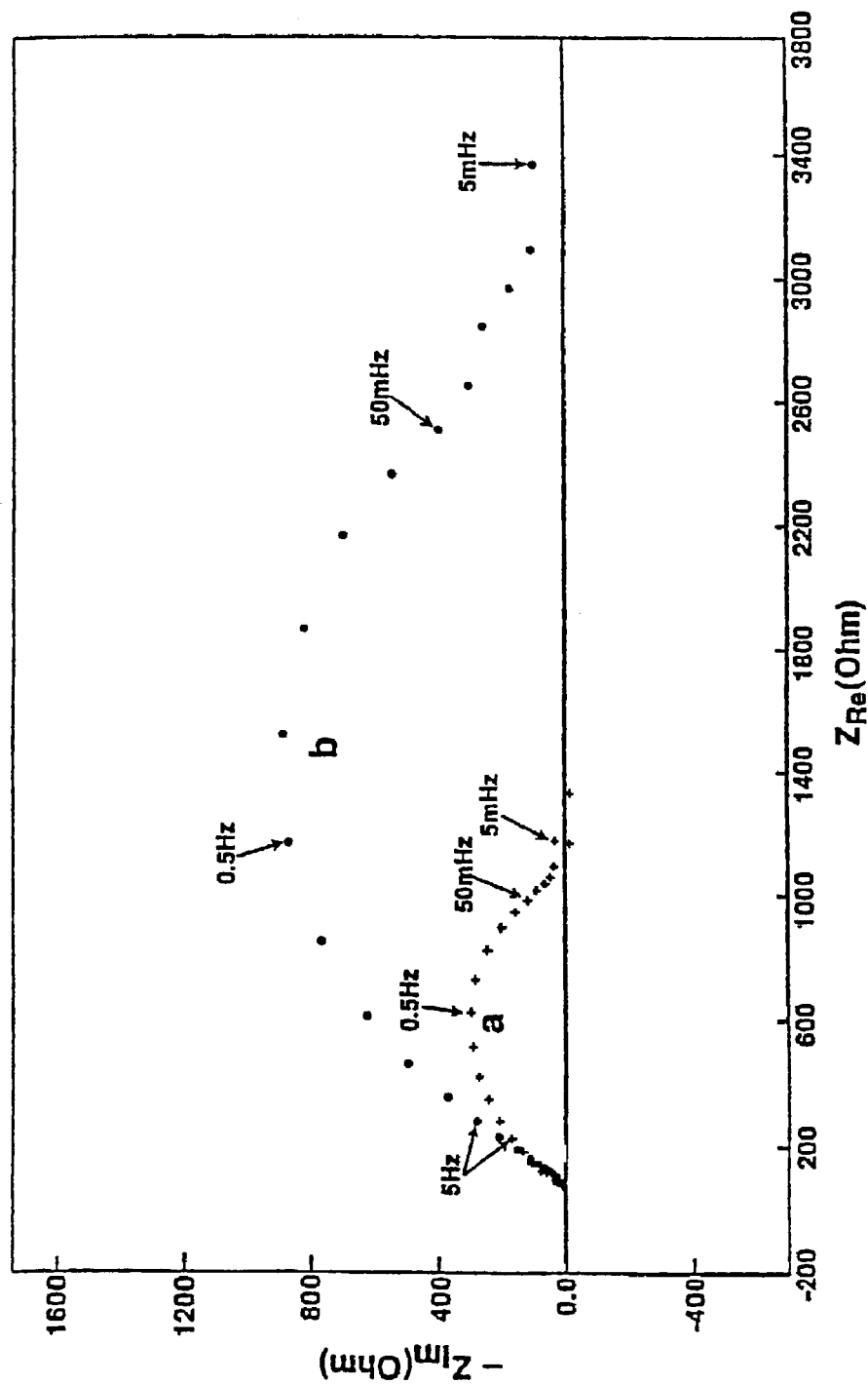

FIG. 7. Diagram of impedance in 0.1N H$_2$SO$_4$ of a) an iron electrode and b) an iron electrode modified by 4-hexadecyloxyphenyl groups.

Figure 8:
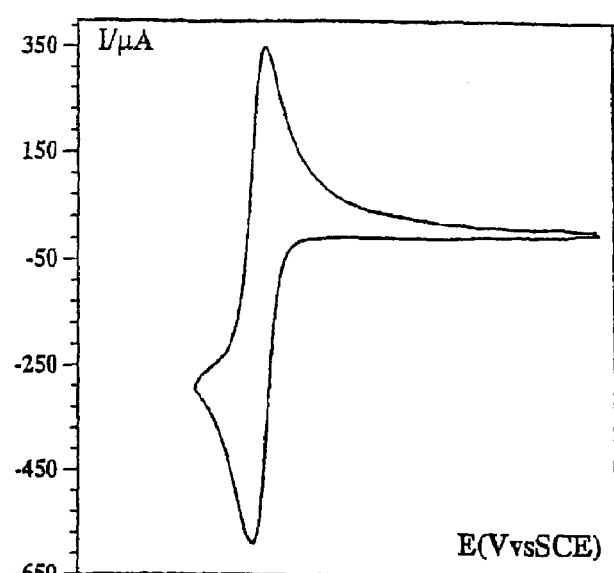
Figure 8:
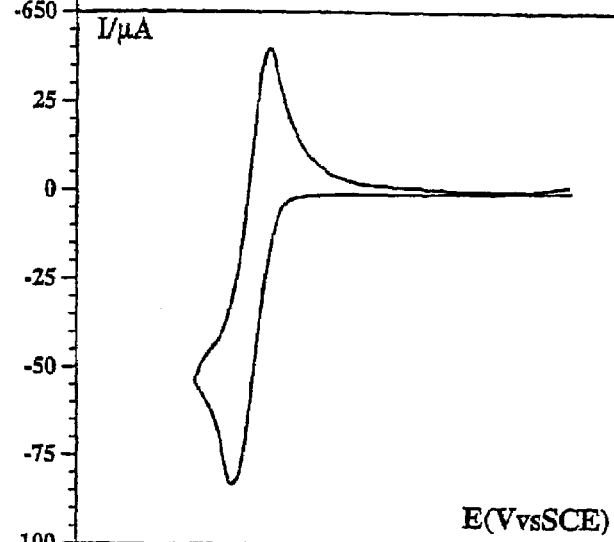
Figure 8:
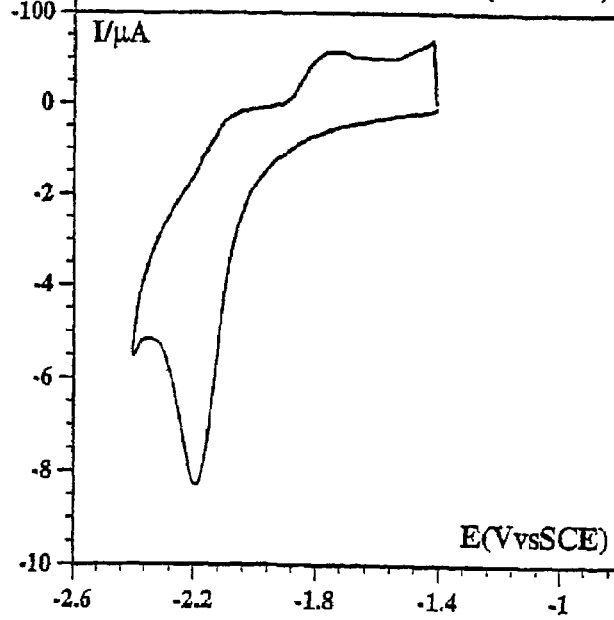

FIGS. 8a, 8b, 8c. Voltammograms in ACN+0.1M NBu$_4$BF$_4$ of a) a carbon electrode in an anthracene solution (concentration=2 mM), b) a zinc electrode in an anthracene solution (concentration=2 mM) and c) a zinc electrode, grafted (in ACN+0.1M NBu$_4$BF$_4$+2 mM 10) with anthracenyl groups. v=0.2 V/s.

Figure 9:
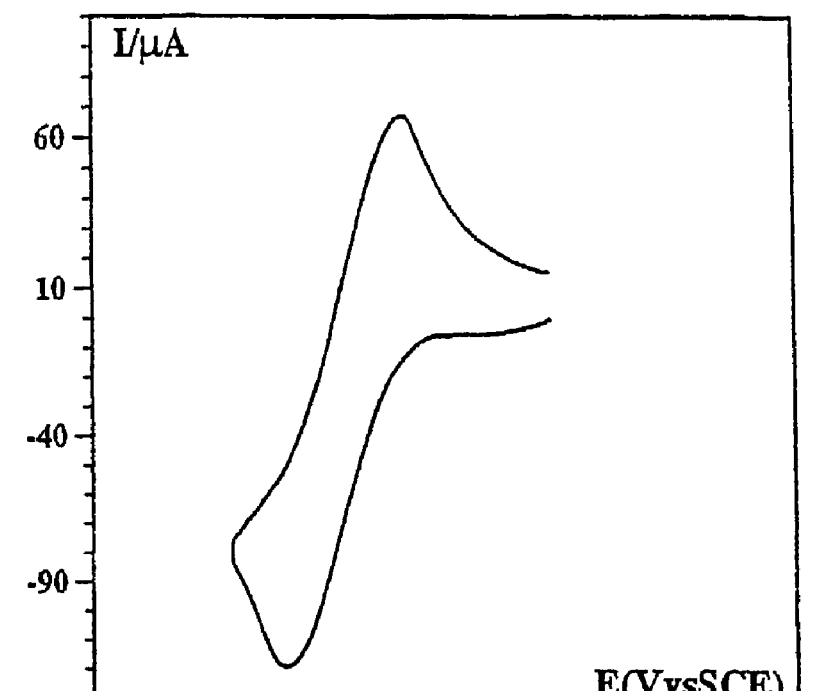
Figure 9:
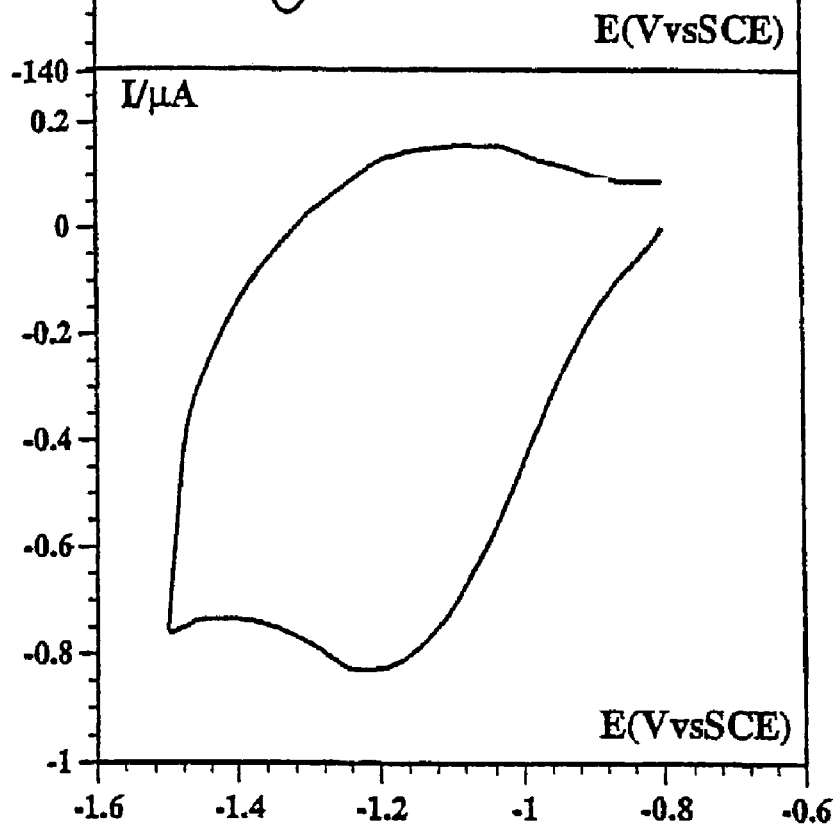

FIGS. 9a, 9b. Voltammogram in ACN+0.1M NBu$_4$BF$_4$ of a) a carbon electrode in the presence of nitrobenzene, b) a zinc electrode, grafted (in ACN+0.1M NBu$_4$BF$_4$+2 mM 1) with 4-nitrophenyl groups.

Figure 10:
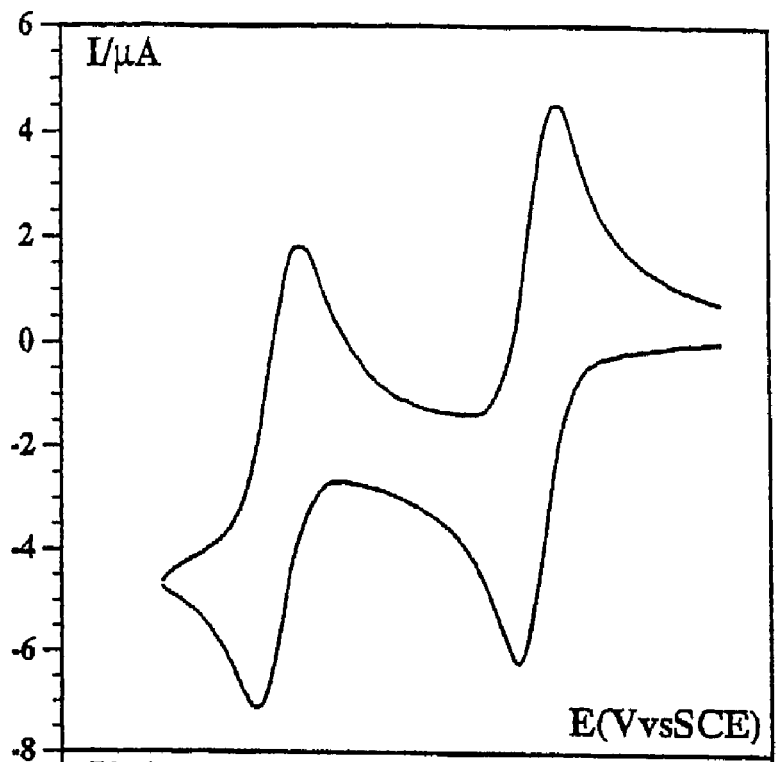
Figure 10:
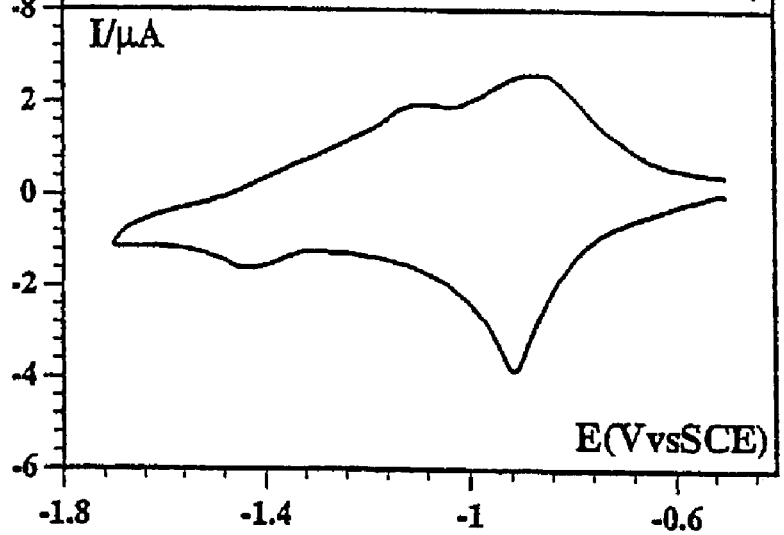
Figure 11:
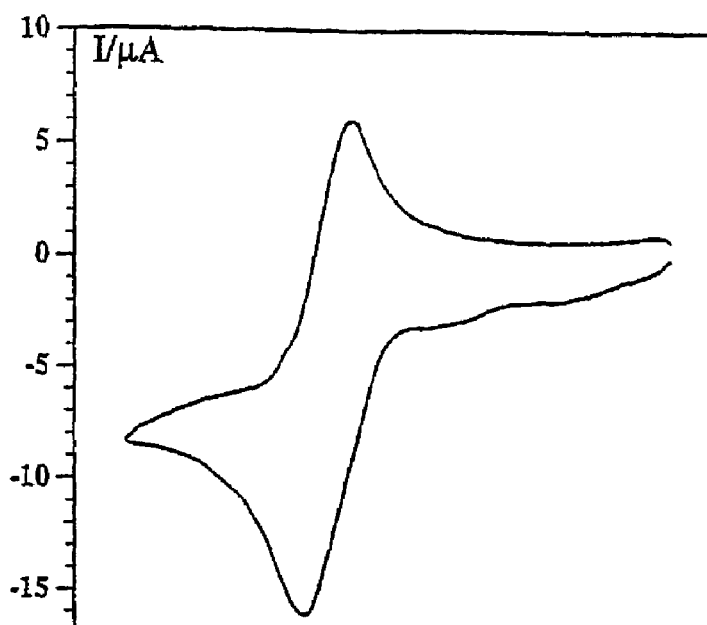
Figure 11:
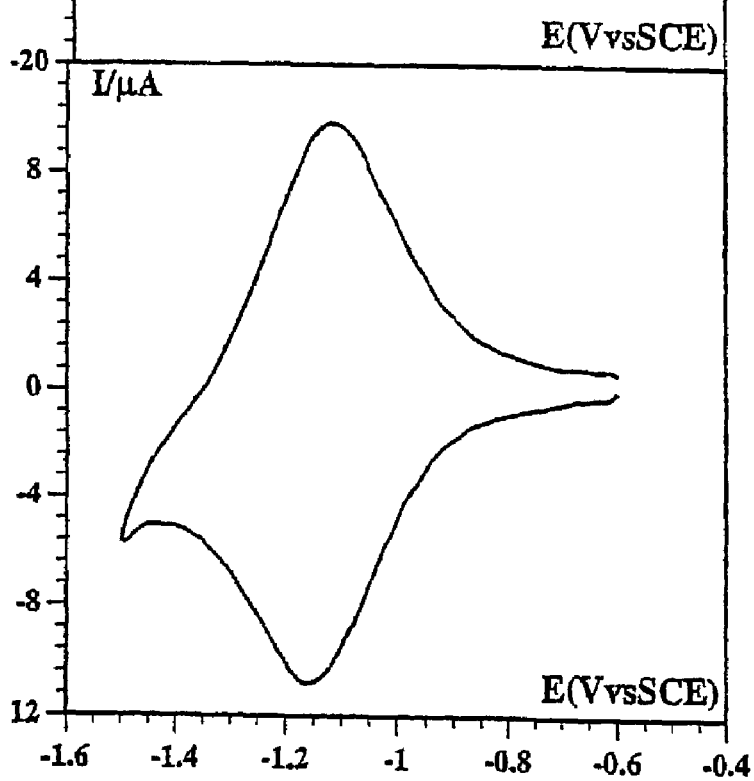

FIGS. 10a, 10b. Cyclic voltammetry on a copper electrode in a solution ACN+0.1M NBu$_4$BF$_4$ a) in the presence of anthraquinone (concentration=2 mM) and b) after grafting of the electrode (in ACN+0.1M NBu4BF$_4$+2 mM 11) with anthraquinone groups. Reference SCE, v=0.2 V/s FIGS. 11a, 11b. Cyclic voltammetry on a copper electrode in a solution ACN+0.1M NBu$_4$BF$_4$ a) in the presence of nitrobenzene (concentration=2 mM) and b) after grafting of the electrode (in ACN+0.1M NBu$_4$BF$_4$+2 mM 1) with 4-nitrophenyl groups. Reference SCE, v=0.2 V/s FIGS. 12a, 12b, 12c. Cyclic voltammetry on a nickel electrode in a solution ACN+0.1M NBu$_4$BF$_4$ a) in the presence of diazonium salt 1 (concentration=2 mM), b) in the presence of nitrobenzene (concentration=2 mM) and c) after grafting of the electrode (in ACN+0.1M NBu$_4$BF$_4$+2 mM 1) with 4-nitrophenyl groups. Reference SCE, v=0.2 V/s FIGS. 13a, 13b. Cyclic voltammetry of a cobalt electrode a) in a solution ACN+0.1M NBu$_4$BF$_4$ b) after grafting of the electrode (in ACN+0.1M NBu$_4$BF$_4$+2 mM 1) with 4-nitrophenyl groups. Reference SCE, v=0.2 V/s.

Figure 15:
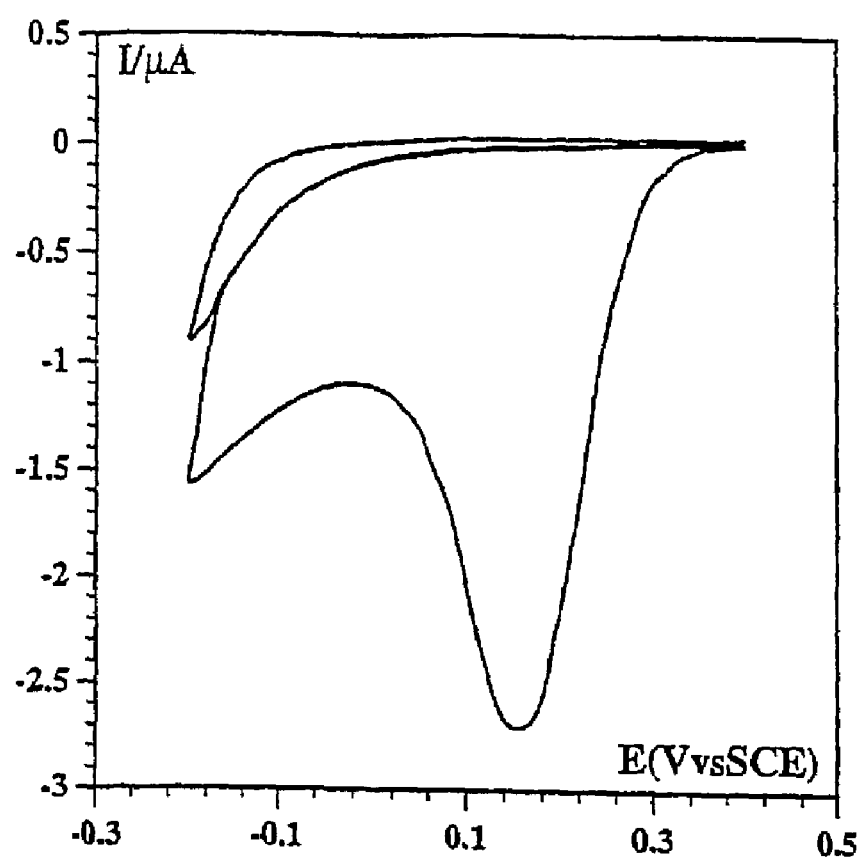
Figure 15:
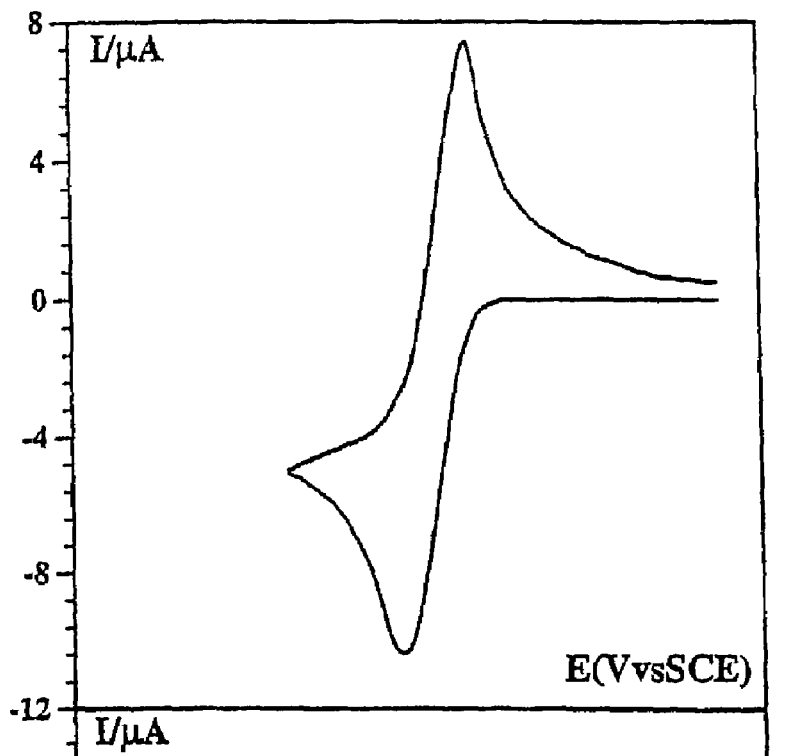
Figure 15:
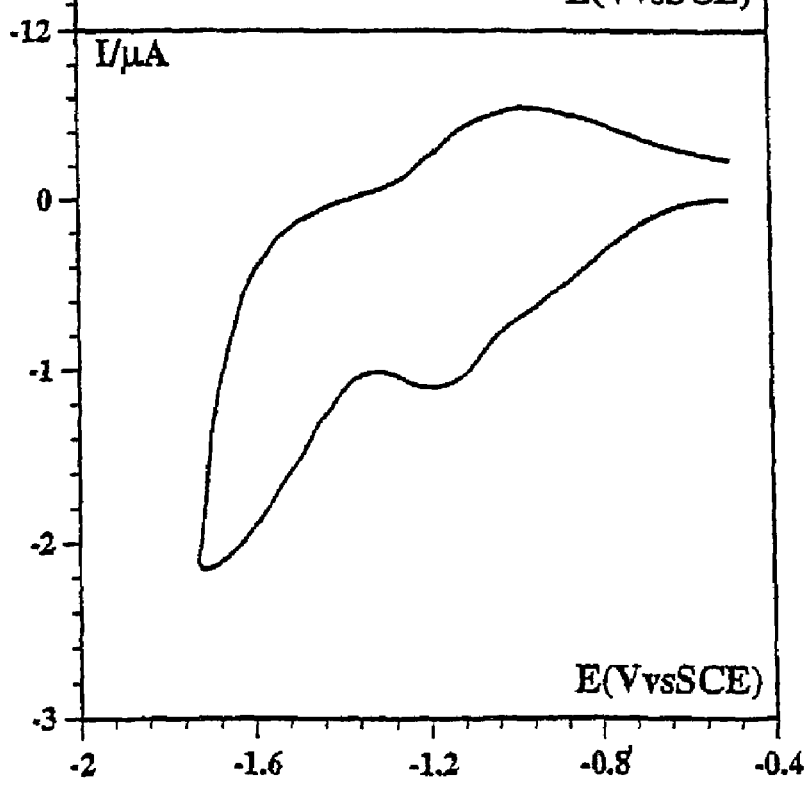

FIGS. 14a, 14b, 14c. Cyclic voltammetry on a gold electrode in a solution ACN+0.1M NBu$_4$BF$_4$, a) in the presence of 4-nitrobenzenediazonium tetrafluoroborate 1, b) in the presence of nitrobenzene (concentration=2 mM) and c) after grafting of the electrode (in ACN+0.1M NBu$_4$BF$_4$+2 mM 1) with 4-nitrophenyl groups. Reference SCE, v=0.2 V/s FIGS. 15a, 15b, 15c. Cyclic voltammetry on a platinum electrode in a solution ACN+0.1M NBu$_4$BF$_4$, a) in the presence of 4-nitrobenzenediazonium tetrafluoroborate 1, b) in the presence of nitrobenzene (concentration=2 mM) and c) after grafting of the electrode (in ACN+0.1M NBu$_4$BF$_4$+2 mM 1) with 4-nitrophenyl groups. Reference SCE, v=0.2 V/s.

Figure 16:
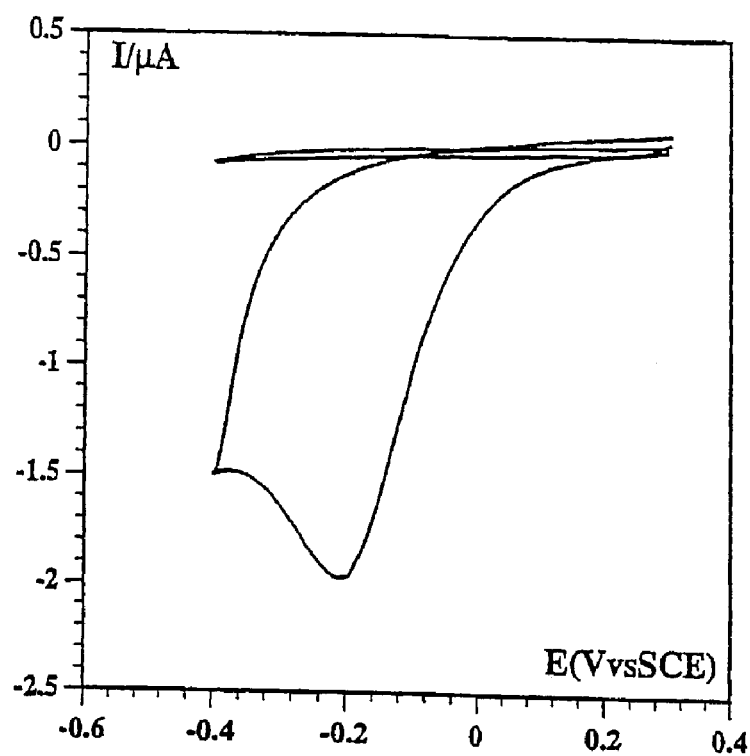
Figure 16:
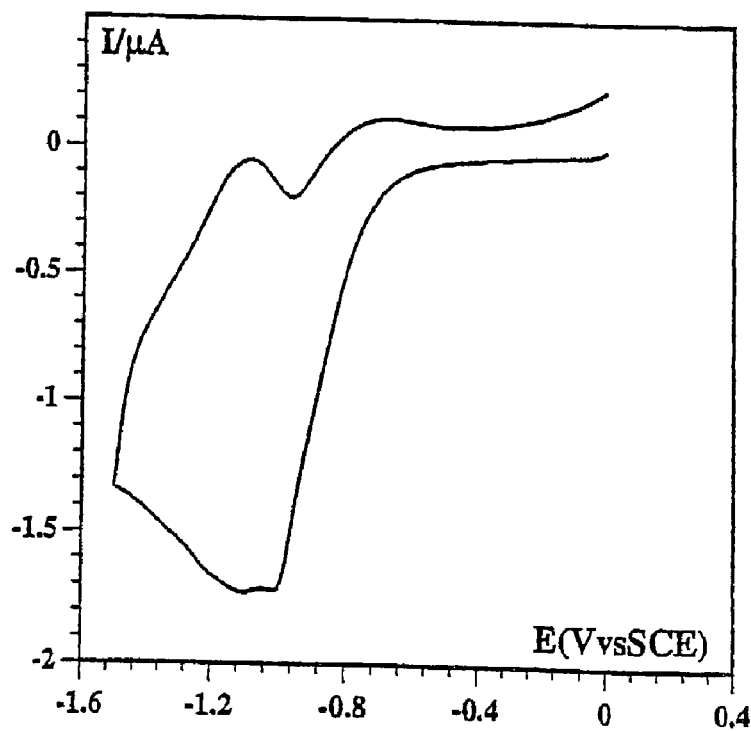

FIGS. 16a, 16b. Cyclic voltammetry on a titanium electrode in a solution ACN+0.1M NBu$_4$BF$_4$ a) in the presence of 4-nitrobenzenediazonium tetrafluoroborate 1 (concentration=2 mM) and b) after grafting of the electrode (in ACN+0.1M NBu$_4$BF$_4$+2 mM 1) with 4-nitrophenyl groups. Reference SCE, v=0.2 V/s FIGS. 17a, 17b, 17c. Cyclic voltammetry on a stainless steel electrode in a solution ACN+0.1M NBu$_4$BF$_4$, a) in the presence of 4-nitrobenzenediazonium tetrafluoroborate 1, b) after grafting of the electrode (in ACN+0.1M NBU$_4$BF$_4$) with 4-nitrophenyl groups, and c) in the presence of nitrobenzene (concentration=2 mM). Reference SCE, v=0.2 V/s FIG. 18. Cyclic voltammetry in a solution ACN+0.1M NBu$_4$BF$_4$ of a) an iron electrode in the presence of anthracene (c=2.5 mM) and b) an iron electrode grafted with anthracenyl groups. Reference SCE, v=0.2 V/s.

Figure 19:
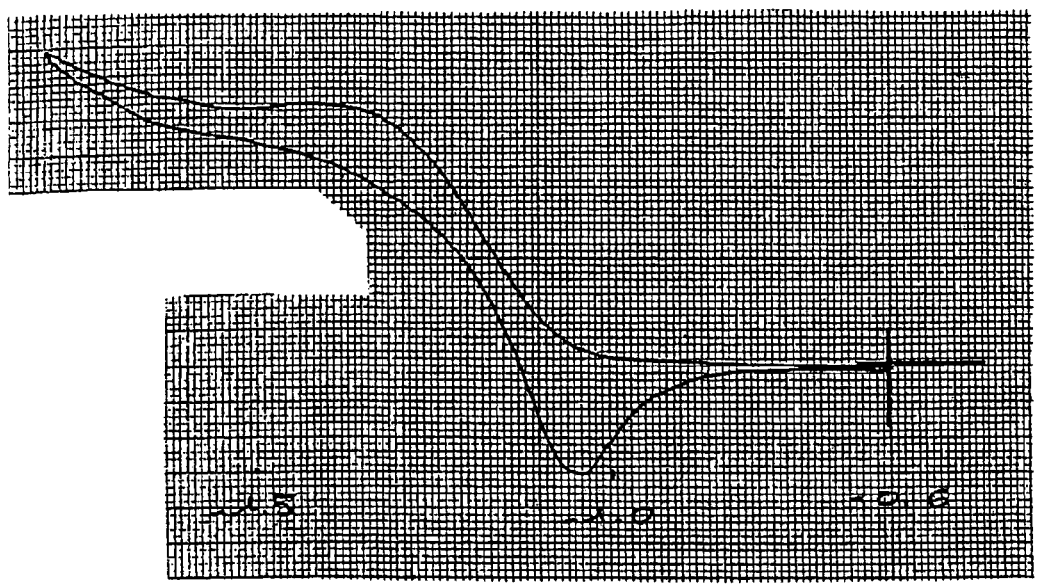

FIG. 19. Cyclic voltammogram on an iron electrode (diameter 1 mm) in a solution ACN+0.1M NBu$_4$BF$_4$ in the presence of nitrobenzene (concentration=1 mM). Reference SCE. v=0.1 V/s. Scale of the abscissa axis: 100 mV/cm. Scale of the ordinate axis: 5 µA/cm (Comparative example No. 1)

Figure 20:
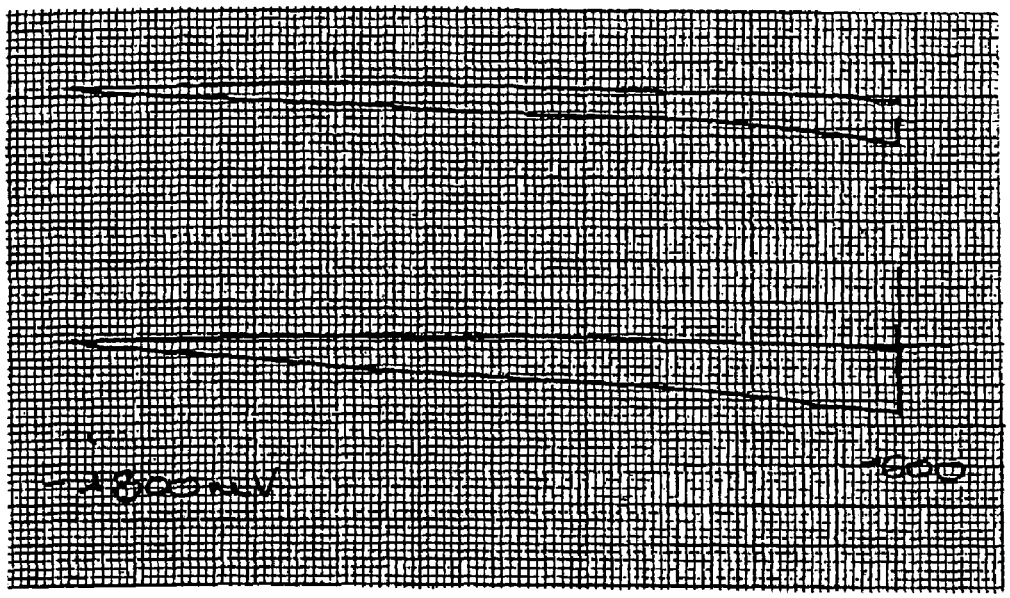

FIG. 20. Cyclic voltammogram on the preceding iron electrode; this test is conducted after obtaining the voltammogram of FIG. 19 and with the same electrode as that used for FIG. 19 (after thorough rinsing in an ultrasonic tank) in a solution of ACN+0.1M NBu$_4$BF$_4$. Reference SCE. v=0.1 V/s. Scale of the abscissa axis: 100 mV/cm. Scale of the ordinate axis: 0.8 µA/cm (Comparative example No. 1)

FIGS. 21A, 21B. Cyclic voltammogram on an iron electrode (diameter 1 mm) in a solution of ACN+0.1M NBu$_4$BF$_4$ in the presence of p-nitrophenol (concentration=1 mM). Reference SCE. v=0.3 V/s. Curve (A) corresponds to the electrode blank and curve (B) to the voltammogram in the presence of p-nitrophenol. Scale of the abscissa axis: 100 mV/cm. Scale of the ordinate axis: 0.8 µA/cm (Comparative example No. 2)

Figure 21:
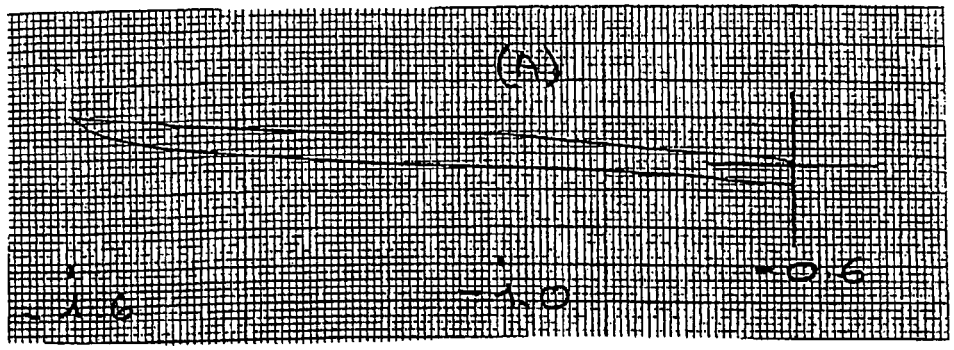
Figure 21:
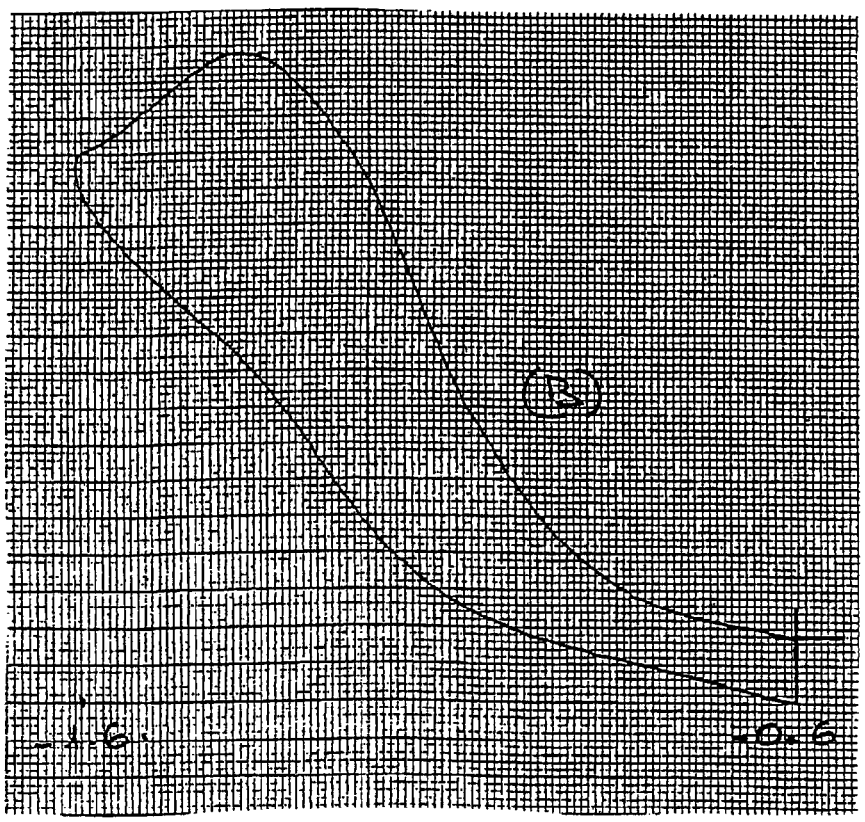
Figure 22:
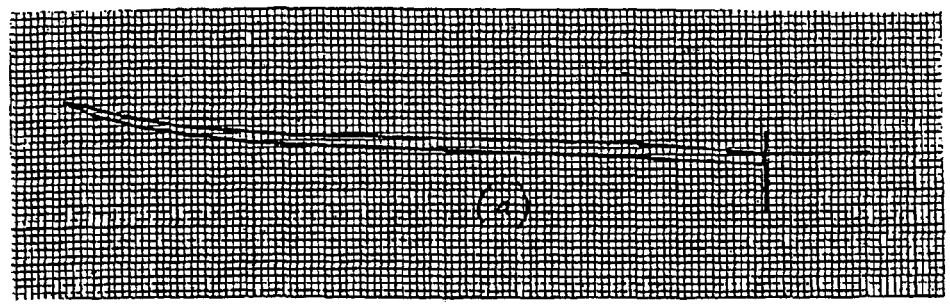
Figure 22:
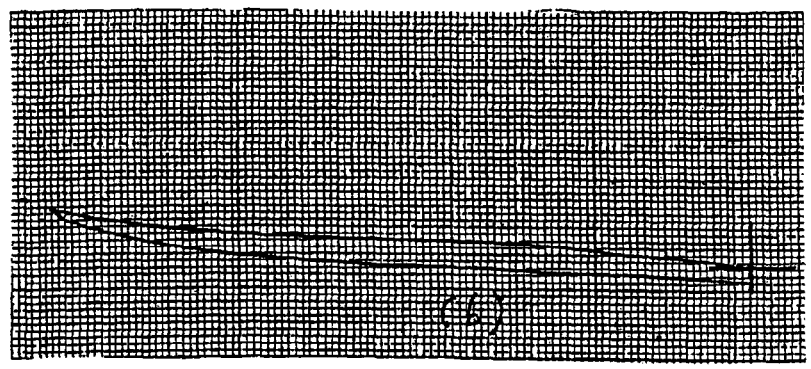

FIG. 22. Cyclic voltammogram on the preceding electrode (see FIGS. 20A and 20B) in a solution of ACN+0.1M NBu$_4$BF$_4$; this test is conducted after obtaining the voltammogram of FIG. 21B and thorough rinsing of this electrode in an ultrasonic tank. Reference SCE. (a) v=0.1 V/s and (b) v=0.3 V/s. Scale of the abscissa axis: 100 mV/cm. Scale of the ordinate axis: 0.8 µA/cm (Comparative example No. 2)

EXAMPLES

Experimental Section

Chemical products, Electrodes. The ACN is from Merck (Uvasol), H$_2$SO$_4$ from Prolabo (Tritrinorm) and NBu$_4$BF$_4$ from Fluka (puriss.). The diazonium salts: 1 and 11 are of commercial origin (Aldrich), synthesis of 3 has been described[1c]; 2, 3–6, 9, 10 were obtained starting from commercial amines by standard methods[27]. The diazonium salts are stored in a refrigerator.

4-iodobenzene diazonium tetrafluoroborate 2[28]: M.p. 126° C. (in the literature 123–124° C.); $^1$H NMR (200 MHz, DMSO): δ=8.4 (q, 4H, aromatics).

4-methylbenzene diazonium tetrafluoroborate 4[29]: M.p. 110° C., decomp. (in the literature 110° C., decomp.); $^1$H NMR (200 MHz, DMSO): δ=2.5 (q, 3H, CH$_3$), 7.8–8.5 (two d, 4H, aromatics).

4-n-butylbenzene diazonium tetrafluoroborate 5[28]: In an Erlenmeyer placed in an ice bath, dissolve 4-n-butyl aniline (149 mg, 1 mmol) in $HBF_4$ (34%, d=1.23, 3 mmol, 30 mL) and stir for 15 minutes, then add $NaNO_2$ (1.5 mmol, 103 mg). Stir the mixture for 20 minutes. Then add $CH_2Cl_2$ (30 mL) and separate the organic and aqueous layers. Dry the organic phase over $MgSO_4$ and evaporate to give a pale yellow solid. As indicated in the literature, it is not possible to measure a melting point[28]; $^1H$ NMR (200 MHz, DMSO): δ=0.9 (t, $^3J$=6 Hz, 3H, $CH_3$), 0.8–2.8 (m, 5H, $CH_2$), 2.8 (t, $^3J$=8 Hz, 2H, benzyl $CH_2$), 7.6–8.5 (q, $^3J$=8 Hz, 4H, aromatics).

4-n-dodecylbenzene diazonium tetrafluoroborate 6[30] M.p. 70° C., decomp.; $^1H$ NMR (200 MHz, DMSO): δ=0.85 (t, $^3J$=6 Hz, 3H, $CH_3$), 1.1–2.8 (m, 20H, $CH_2$), 2.5 (t, $^3J$=8 Hz, 2H, benzyl $CH_2$), 7.8–8.5 (q, $^3J$=8 Hz, 4H, aromatics).

Diazonium salt 7 was prepared from 4-dodecyloxyaniline [31]: white solid, $^1H$ NMR (200 MHz, DMSO): δ=0.8–1.8 (m, 25H, aliphatic protons), 4.3 (t, 2H, O—$CH_2$), 7.5–8.5 (q, $^3J$=8 Hz, 4H, aromatics).

Diazonium salt 8 was prepared in the same way, except that the diazonium salt contained a little more of white solid amine: $^1H$ NMR (200 MHz, DMSO): δ=0.8–1.8 (m, 33H, aliphatic protons), 4.2 (t, 2H, O—$CH_2$), 7.2–8.5 (q, $^3J$=8 Hz, 4H, aromatics)

The electrodes were prepared from metal wire, for example from iron wire with a diameter of 1 mm (Johnson Matthey 99.99%) sealed in epoxy resin or from buttons of soft iron with diameter of 3 mm held in a Teflon clamp. The plates of mild steel (containing 95.68% Fe, 0.31% C, 2.03% Mn, 0.05% P, 0.13% S, 0.56% N, 0.10% Si, 0.07% Cu, 0.18% Ni, 0.30% Cr, 0.01% Sn, 0.58% Al) were donated by the Sollac company.

Electrochemical equipment: The electrochemical curves were obtained using a potentiostat constructed in the laboratory or using a Versastat II system from EGG. The impedance measurements were obtained with an EGG 263A potentiostat and a 5210 EGG lock-in amplifier. The frequencies investigated varied from 0.001 Hz to 20 kHz and the corrosion currents were obtained from Tafel straight lines with EGG corrosion software.

Surface characterization: The equipment for XPS, PMIR-RAS and RBS and the conditions of use have been described previously [1c].

Example I

Grafting of Iron

Electrochemical tests of grafting. The grafting reaction was investigated both in an aprotic medium [acetonitrile (ACN)+0.1M $NBu_4BF_4$] and in an aqueous acidic medium (the diazonium salts are not stable in an aqueous medium above pH 2). In ACN+0.1M $NBu_4BF_4$ an iron electrode has a range of electro-activity that is between −0.1 and −2.3 V/SCE; in dilute sulphuric acid (0.1 N) this range is reduced to nothing. The open-circuit voltage (corrosion voltage)[10] is located at −0.58 V/SCE and corresponds to a mixed voltage since the reduction and oxidation reactions are different. The anode or cathode partial current that flows at this voltage is called the corrosion current ($I_{corr}$). As soon as the voltage is displaced to positive voltages, the oxidation current of the iron predominates, whereas the reduction of protons or of oxygen predominates when the voltage is shifted towards negative values [11]. It should be recalled that even at the corrosion voltage, where the current is zero, the phenomena of oxidation of the iron and reduction of the protons and/or of the oxygen take place simultaneously. At the corrosion voltage, the two currents are equal. The region of electro-activity is therefore completely different from that of a carbon electrode and it is not always possible, as we have described previously,[1] to observe the reduction wave of the diazonium salts located near 0 V/SCE.

In ACN, the only general way of grafting aryl groups on the surface of iron is to set the voltage to a value more negative than −0.5 V/SCE in a solution containing the diazonium salt and to a value close to the corrosion voltage in 0.1N $H_2SO_4$ (we shall see later that it is possible to determine an optimum voltage of −0.75 V/SCE in this solvent). In doing this, it is assumed that the diazonium salts are reduced at similar voltages on carbon and on iron. The reduction potential of the diazonium salts and the oxidation potential of iron in an aqueous medium makes it thermodynamically possible for diazonium salts to be reduced by iron. We shall see later that XPS measurements show that this spontaneous reaction is negligible for grafting on iron, but spontaneous grafting on stainless steel has been observed.

The reduction of 4-nitrobenzene diazonium tetrafluoroborate 1, which, on carbon, leads to grafting of 4-nitrophenyl groups was investigated. These groups are readily characterized by their reversible reduction wave in an aprotic medium which is located at the same potential as that of nitrobenzene. First of all we recorded the cyclic voltammogram of nitrobenzene in ACN+0.1M $NBu_4BF_4$ on an iron electrode; two waves are observed, at −1.22 and −1.75 V/SCE (not shown), the height of the second being almost double that of the first. The first wave is reversible since an anode wave is observed at −1.00 V/SCE during the return sweep. The standard potential of nitrobenzene can therefore be measured: ° E=−1.11 V/SCE. This voltammogram is similar to that observed on carbon electrodes (FIGS. 1a, 1b).

Figure 18:
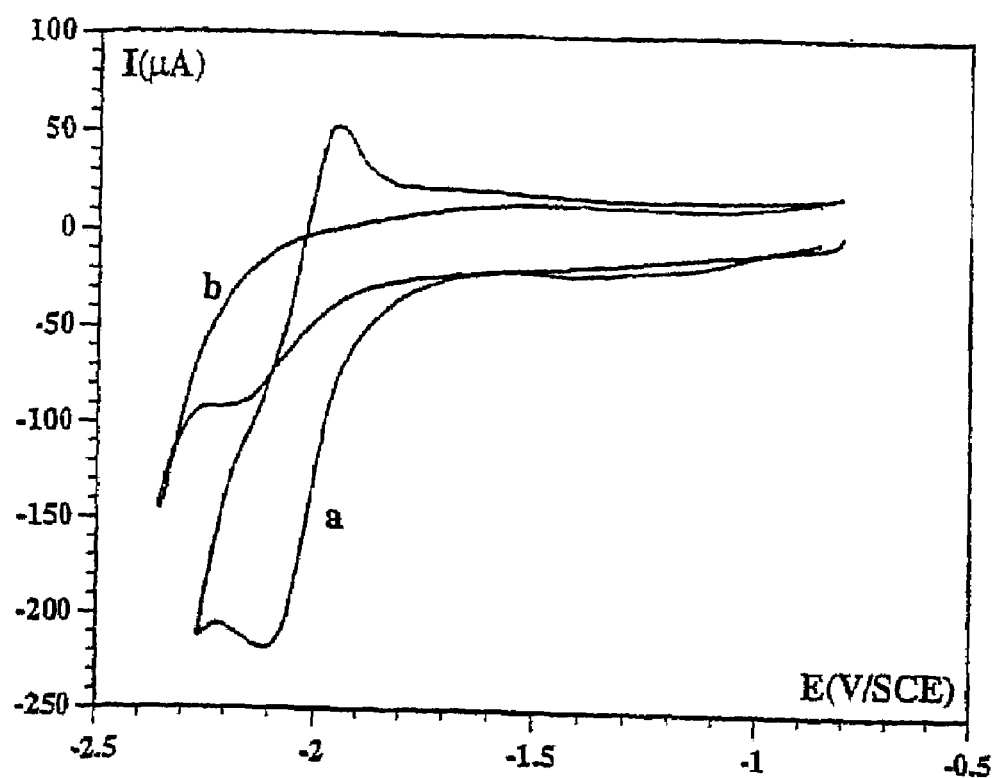

Next, the voltage of an electrode is maintained at −0.8 V/SCE for 5 minutes in a solution of ACN+0.1M $NBu_4BF_4$ containing diazonium salt 1 (c=2 mM). The electrode is then rinsed carefully in an ultrasonic tank for five minutes then transferred to a fresh solution containing only the solvent and the supporting electrolytes. In these conditions, a broad, reversible wave is observed ($E_{pc}$=−1.25 V/SCE and $E_{pa}$=−1.12 V/SCE) at a potential very close to that of nitrobenzene itself (FIG. 1c). This experiment clearly shows that the 4-nitrophenyl groups are transferred with the electrode and that they are firmly fixed since they withstand cleaning in an ultrasonic tank. FIGS. 2a and 2b show the results obtained with diazonium salt 11 which is a commercial diazonium salt of anthraquinone. The iron electrode, which was modified and carefully rinsed as above, exhibits a reversible system with a cathode peak at $E_{pc}$=−0.93 V/SCE and an anode peak at $E_{pa}$=−0.88 V/SCE which corresponds to a standard potential E°=−0.90 V/SCE. By comparison, anthraquinone exhibits on an iron electrode, a slow electrochemical system ($E_{pc}$=−1.08 V/SCE and $E_{pa}$=−0.75 V/SCE) at ° E=−0.91 V/SCE, i.e. at the same potential as the modified electrode. This experiment confirms the observations made with diazonium salt 1. Moreover, the symmetrical shape of the voltammogram indicates a redox system without diffusion from and to the electrode as was to be expected for groups grafted to the surface of the electrode. Attention should also be drawn to the great stability of the system during the successive sweeps. Similar results were obtained with anthracenyl groups bound to the surface by reduction of diazonium salt 10 (FIG. 18).

Electrochemical modification of a vitreous carbon electrode with 4-nitrophenyl groups was carried out previously by reduction of diazonium salt 1 in dilute $H_2SO_4$ and the signal of the 4-nitrophenyl groups was observed in a solution of ACN+0.1M NBu4BF$_4$. Such a result cannot be observed with an iron electrode that has been modified by reduction of diazonium salt 1. This is because during electrolysis of diazonium salt 1 in an acid medium at the grafting voltage, E=−0.75 V/SCE, the nitro group is reduced to amine (the voltammogram of nitrobenzene on a vitreous carbon electrode under the same conditions as above corresponds to the transfer of 6e$^-$+6H$^+$), a function that cannot be reduced electrochemically and so cannot be observed by cyclic voltammetry. However, an iron electrode modified by reduction of diazonium salt 11 at E=−0.5 V/SCE in 0.1N H$_2$SO$_4$, carefully rinsed and transferred to a solution of ACN+0.1M NBu$_4$BF$_4$, displays a weakly reversible voltammogram (E$_{pc}$≈−0.9 V/SCE and E$_{pa}$≈−0.6 V/SCE) at ° E≈−0.7 V/SCE. This voltammogram (FIG. 3) is similar to that of anthraquinone in ACN+0.1M NBu$_4$BF$_4$ on an iron electrode previously held in a solution of 0.1N H$_2$SO$_4$ for five minutes. These experiments in an acid medium show that it is possible to graft aryl groups on the surface of iron but the voltammograms obtained are different from those obtained by grafting in ACN. This is evident from a loss of reversibility and slower electron transfer. The loss of reversibility may be due to acidic species transferred with the electrode despite vigorous rinsing.

Modification of the surface of iron by reduction of diazonium salts is therefore possible in ACN and aqueous acidic solutions, but it is more easily observed in ACN. These results were then confirmed by other methods.

Vibration spectra of the organic layer: As in the case of organic monolayers on carbon, it is difficult to obtain infrared spectra of monolayers by reflection. However, this can be achieved by PMIRRAS (Polarization Modulation InfraRed Absorption Spectroscopy [12]). The spectra were recorded on plates of mild steel (an industrial material that needs to be protected against corrosion). Before grafting, the plates were carefully polished and rinsed in the absence of oxygen in an ultrasonic tank. An ungrafted plate exhibits absorptions at 1050–1100 cm$^{-1}$ that are characteristic of oxides as well as absorptions at 1400 and 1600–1700 cm$^{-1}$ that correspond to carbonates and to hydrogen-carbonates (which probably arise from reaction with atmospheric carbon dioxide after grafting) (FIG. 4a). After grafting with diazonium salt 1 in a solution of ACN+0.1M NBu$_4$BF$_4$ the symmetrical and antisymmetrical vibrations of the NO$_2$ group [13] are clearly visible at 1350 and 1522 cm$^{-1}$ as well as the absorptions of the aromatic group at 1263 and 1600 cm$^{-1}$ (FIG. 4b). The peaks of the oxides can be seen, but those of the carbonates have disappeared. If grafting is carried out in 0.1N sulphuric acid, a strong band is observed at 1180 cm$^{-1}$ which may be due to a thicker layer of oxide or to the presence of sulphates, however, the signal of the NO$_2$ group can still be observed (FIG. 4c).

Rutherford Backscattering Spectra (RBS): This method, which measures the number of He$^+$ ions backscattered at a given energy, permits characterization of the presence of a given type of atoms on the surface, as well as their number. It is, however, necessary for the atomic number of the atom being identified to be higher than that of iron. To fulfil this condition, we grafted carefully polished mild steel plates by reduction of 4-iodobenzene diazonium tetrafluoroborate in ACN. The spectrum of this plate is shown in FIG. 5. Table 1 shows the result of various tests as a function of the solvent and of the voltage. The only peak observed apart from that of iron corresponds to the iodine atoms, providing good confirmation of grafting of the iodated molecule. Furthermore, analysis shows that grafting is uniform on the whole surface of the specimen and remains stable under the ion beam. In dilute sulphuric acid the optimum value of the voltage is −0.75 V/SCE corresponding to a maximum surface concentration; at more positive potentials, grafting competes with oxidation of the surface and with reduction of protons at more negative potentials. The surface concentrations will be discussed later.

X-ray Photoelectron Spectroscopy (XPS): It should be noted that RBS and XPS are complementary methods of surface analysis since the depth of sampling in the first is about two orders of magnitude less than in the second. FIGS. 6a, 6b, 6c and 6d show the complete spectrum of a plate of mild steel (FIG. 6a) and of plates grafted with 4-nitrophenyl groups (FIG. 6b), 4-carboxyphenyl groups (FIG. 6c) and 4-iodophenyl groups (FIG. 6d). All these general spectra exhibit the peaks C$_{[1s]}$, O$_{[1s]}$, F$_{[2p]}$ at energies of 285, 530 and 710 eV. FIG. 6b clearly shows the grafting of diazonium salt 1 after electrochemical treatment. This grafting is reflected in a definite increase in relative intensity of the C[1s] peak and a small peak at about 400 eV. The enlargement of this region reveals two peaks centred at 400 and 406 eV, the latter corresponding to the nitro group, whereas the first may be due either to contamination or to products of reduction of the nitro group. It should be pointed out that the O[1s] peak has been adjusted with a component at 533 eV, a characteristic energy of the oxygen of a nitro group[14], at the same time as with a component with lower bond energy due to iron oxides. After reduction of the 4-carboxybenzene diazonium tetrafluoroborate 3, the spectrum of the mild steel plate has a C$_{(1s)}$ peak at 289 eV at the same time as O$_{(1s)}$ signals at 531 and 532 eV attributed respectively to the carbon and to the oxygen of the C=O and of the OH of the carboxyl group as well as an F$_{[1s]}$ peak around 690 eV due to surface contamination by BF$_4^-$ ions of the electrolyte (FIG. 6c). When the mild steel plate is modified with 4-iodophenyl groups the signal from the iodine atom can be observed at 621 eV (4.2%) (FIG. 6d). The C/I ratio of 6.25 is close to what is to be expected for an iodophenyl group. In order to verify that the presence of the organic groups on the surface is not due to simple adsorption or to a simple chemical reaction, the same mild steel plate, polished and cleaned as previously, was immersed in a solution of diazonium salt 2 in ACN+0.1M NBu$_4$BF$_4$. Under these conditions a weak is observed signal corresponding to iodine (0.45%). This weak signal may be due to a spontaneous reaction of diazonium salt 2 by the iron, as explained above. The attenuation of the intensity of the peak of Fe$_{[2p]}$ by the organic layer grafted by reduction of diazonium salt 1, 2 or 3 should be noted. A notable increase in background noise is also observed, especially in the case of grafting of diazonium salt 2. This molecule seems to have a strong covering power since we no longer observe the doublet of Fe$_{[2p]}$ in the general spectrum. In its place, we observe in the 700–1000 eV region, an increased background noise corresponding to an increased loss of inelastic energy.

XPS spectra were also employed for verifying that grafting did indeed occur on the surface of the iron and not on the oxide, which may always be present on the surface. Two plates were passivated in 1N $H_2SO_4$ with sweeping of the potential up to +1V/SCE (a potential that is located in the passivation zone of iron); passivation by the oxide layer can then be observed as an increase of the oxygen peak from about 20% to about 40%. One of them was immersed in a solution of diazonium salt 2 in ACN+0.1M $NBu_4BF_4$ whereas the other was grafted as previously in the same solution. In both cases we only observe a weak signal from iodine corresponding to 0.3 and 0.4% respectively. These signals are much smaller than those observed (4.2%) on a polished and previously cleaned plate that was then grafted as above. This clearly indicates that the grafting of aryl groups does indeed take place on the iron and not on the oxide layer.

Electrode capacitance: Attachment of an organic layer to the surface of the electrode should lower the capacitance of the said electrode by adding an additional insulating layer in series with the double layer. The capacitance can be measured by an impedance method; we recorded the Nyquist diagram ($Z_{Im}$ vs. $Z_{Re}$) (FIG. 7). It is then possible to obtain $C_d$ from the frequency of the maximum[15]. The capacitance of a pure iron electrode of 3 mm diameter in 0.1N $H_2SO_4$ is 207 µF/cm². After modification of the electrode with 4-hexadecyloxyphenyl groups (by reduction of diazonium salt 8 in 0.1N $H_2SO_4$) the falls to 122 µF/cm².

Surface concentration of grafted groups: Two methods can be used for measuring the surface concentration of aryl groups. In the first it is necessary to measure (after complete rinsing of the electrode and transferring it to a solution of ACN+0.1M $NBu_4BF_4$) the charge used for reducing the nitro group grafted to the surface (by single-electron transfer). This amounts to integration of the voltammogram recorded using an electrode modified with 4-nitrophenyl groups[1]. One of the difficulties of this method is that it requires estimation of a base line and of the end potential of the integration. The second method is based on integration of the RBS spectra; in this case we must be certain that only the grafted zone of the electrode is included in the beam and that the surface is stable under the ion beam. Both methods produce values that are relative to the geometric area (i.e. 1 cm² for a 1 cm×1 cm plate) of the electrode, polished beforehand with 1 µm diamond paste.

The values in Table 1 lead to consistent results for comparable conditions. For example, grafting of 4-nitrophenyl and 4-iodophenyl groups, that are of comparable size, leads to similar surface concentrations, but if we increase the size of the group attached, going from 4-iodophenyl to anthracenyl or to anthracenyl-9,10-dione, the surface concentration decreases. When grafting is carried out in ACN, the surface concentrations are higher than the values obtained in 0.1N $H_2SO_4$, this may be due to oxidation of the surface in the sulphuric acid, which decreases the area available for grafting the aryl groups, or to hydrogen atoms formed on the surface or that have penetrated the metal[16] and which, by changing the surface properties, would make the electrochemical reaction more difficult. The surface concentrations shown in Table 1 can be compared with those measured previously on carbon and in particular on HOPG (the geometric area of which is very close to the actual area).

TABLE 1

Surface concentration of aryl groups[a]

| Sample | Solvent[c] | Electrolysis potential V/SCE | Method of measurement | Surface concentration mol/cm² [a] |
|---|---|---|---|---|
| Iron + 1 | ACN | −0.85 | CV | 45 10⁻¹⁰ |
| Iron + 11 | ACN | −0.85 | CV | 12 10⁻¹⁰ |
| Iron + 12 | ACN | −0.85 | CV | 8 10⁻¹⁰ |
| Steel + 2 | ACN | −0.85 | RBS | 48 10⁻¹⁰ |
| Steel + 2 | 0.1N $H_2SO_4$ | −0.50 | RBS | 25 10⁻¹⁰ |
| Steel + 2 | " | −0.65 | RBS | 22 10⁻¹⁰ |
| Steel + 2 | " | −0.75 | RBS | 32 10⁻¹⁰ |
| Steel + 2 | " | −0.85 | RBS | 15 10⁻¹⁰ |
| Steel | — | — | RBS | 0 |

[a] Surface concentration (referred to the geometric area).
[b] Electrode material + diazonium salt used for grafting.
[c] Used for grafting.

The surface concentration of 4-nitrophenyl groups is from 12 to 18 10⁻¹⁰ mol/cm² [1,2] on HOPG, but on vitreous carbon, polished under the same conditions as the iron plates, a value of 40 10⁻¹⁰ mol/cm² was obtained by reduction of diazonium salt 1. Therefore there is good agreement between the values obtained on steel and on carbon. This result was compared with the consumption of charge required for grafting by recording the chronopotentiometric curves (E=f(t) at constant current). In the case of grafting of diazonium salt 5 the first transition time corresponds to reduction of the diazonium function. Practically identical transition times were measured on carbon and on iron. This indicates that the same quantity of charge is required to obtain complete covering of the electrode up to the time when the diazonium is no longer reduced on the electrode. On HOPG it was demonstrated previously that the surface concentrations obtained correspond to a compact monolayer of aryl groups perpendicular to the surface[1], a stereochemical situation in which the 4-nitrophenyl group and the 4-iodophenyl group occupy the same surface and the anthracenyl groups occupy a larger surface.

Influence of the grafted layer on the corrosion of iron and mild steel. The effect of the organic layer was assessed by measuring two parameters: the polarization resistance $R_p$ and the corrosion current $i_{corr}$. Before making any measurements, the electrodes of iron or of mild steel were carefully polished and pickled at constant cathode current in $HClO_4$ [17] then left to stabilize in the measurement medium for about three hours at the open-circuit voltage, the value of which can vary over time[17]. The polarization resistances were obtained either from the gradient of the curve obtained in anodic and cathodic sweeps of the potentials at 0.1 mV/s using the method of Stern and Geary[18,19] or from the impedance diagrams. The real and imaginary impedances were obtained from Nyquist diagrams ($Z_{Im}$ as a function of $Z_{Re}$ for variable values of signal frequency). These diagrams allow the polarization resistance at low frequency and the capacity at maximum $Z_{Im}$[20,21] (FIG. 7) to be obtained.

In order to lower the rates of corrosion, diazonium salts (5, 6, 7, 8) with long alkyl chains were selected so that the long chains provide a hydrophobic barrier that might limit the diffusion of oxygen and of protons. Similarly, compound 9 ought to constitute a very hydrophobic barrier. The results are presented in Table 2.

TABLE 2

Polarization resistance and corrosion currents on modified electrodes of iron or mild steel

| Sample | Diazonium salt[a] | Corrosive medium | $R_p^{[b]}$ Ω | $R_p^{[c]}$ Ω | $i_{corr}$ μA/cm² | $E_{corr}$ mV[d] | $R_I^{[e]}$ |
|---|---|---|---|---|---|---|---|
| Iron | None | 0.1N H$_2$SO$_4$ | 1924 | 1600 | 179 | −475 | — |
| Iron | 5 | 0.1N H$_2$SO$_4$ | 2206 | 2307 | 117 | −520 | 35 |
| Iron | 6 | 0.1N H$_2$SO$_4$ | 2958 | 2721 | 101 | −523 | 44 |
| Iron | 8 | 0.1N H$_2$SO$_4$ | 2042 | 2610 | 84 | −541 | 53 |
| Iron | 9 | 0.1N H$_2$SO$_4$ | 2688 | 2500 | 125 | −527 | 30 |
| Steel | None | 0.1N H$_2$SO$_4$ | 1358 | 1513 | 168 | −546 | — |
| Steel | 5 | 0.1N H$_2$SO$_4$ | 3198 | 4819 | 48 | −515 | 62 |
| Steel | 8 | 0.1N H$_2$SO$_4$ | 3126 | 3627 | 43 | −530 | 66 |
| Iron | None | 5% NaClO$_4$ | 4317 | 4604 | 37 | −690 | — |
| Iron | 5 | 5% NaClO$_4$ | 8205 | 9254 | 13 | −637 | 64 |
| Iron | 8 | 5% NaClO$_4$ | 7167 | 7817 | 13 | −636 | 64 |
| Iron | None | 5% KCl | 3353 | 4319 | 34 | −692 | — |
| Iron | 5 | 5% KCl | 8999 | 9403 | 6 | −738 | 82 |

[a]used for grafting.
[b]obtained from the curves i = f(E).
[c]obtained from the impedance curves.
[d]in mV/SCE.
[e]efficiency of inhibition.

In the three media used, an increase in polarization resistance and a decrease in corrosion current through grafting of the surfaces of iron or of mild steel is observed. There is a good correlation between the results obtained for the polarization resistance measured by the two different methods. Table 2 includes the efficiency of inhibition RI calculated from: RI=100 (1−$i_{cor}^{graft}/i_{cor}$). The corrosion rate is decreased both in the acidic medium, where the protons are the main oxidizing species, and in the neutral medium, where oxygen is responsible for corrosion. In an acidic medium, the corrosion potential is shifted towards the cathode potentials, which can be attributed to predominant cathodic inhibition[23]. In a neutral medium the corrosion potential is shifted anodically, indicating that the organic film makes oxidation of the iron more difficult.

The stability of the grafted layer was measured as a function of the electrode potential. The potential of an iron electrode modified with 4-iodophenyl groups (by reduction of diazonium salt 2 in a solution of ACN+0.1M NBu$_4$BF$_4$) was swept anodically from 75 and 150 mV at 1 mV/s starting from the corrosion potential in 0.1N H$_2$SO$_4$. Then the surface was examined by XPS and RBS: no significant change in surface concentration of iodine is observed for a sweep of 75 mV, but the latter drops to 0 for a sweep of 150 mV. On a mild steel electrode of 0.07 cm², an anode sweep of 75 mV corresponds to the consumption of 9.8 mC or 5 10$^{-8}$ mol of iron dissolved (which was verified by assaying the solution by atomic absorption spectroscopy). This shows that during an anode sweep, the organic groups are detached from the surface at the same time as iron atoms.

The results of the invention can also be compared with the adsorption, on iron, of long-chain ($C_{12}$, $C_{18}$) alkanethiols subjected to the action of octyltriethoxysilane so as to increase the length of the chains and at the same time provide side bonding between the chains.[17] In the case of a C18 alkanethiol in a weakly aggressive medium such as 0.5M NaCl, the transfer resistance increases about 4 times, and about 4.5 times after reaction with octyltriethoxysilane. However, a major drawback of this method is that the thiol is desorbed slowly from the surface. Therefore this surface modification is not stable. The organic layer is not firmly grafted and can be removed in an ultrasonic tank, whereas the layer grafted in accordance with the method of the invention withstands this treatment.

Metallic surfaces (Fe, Ni, Pt) were also modified covalently by electrochemical reduction of vinyl monomers such as acrylonitrile, methacrylonitrile or butene nitrile. Thin films of polymers (≈10 to 50 nm) bound covalently to the surface have been studied in detail[24,25] and have been found to be effective for corrosion protection[26]. The most notable difference between this method and the method of the invention is that the grafted layer is of the alkyl type, the first carbon bound to the metal is a saturated aliphatic carbon whereas according to the invention it is an aromatic carbon that is bound to the metal. From this standpoint, the two methods are quite different; the method of the invention does not make it possible to graft an aliphatic carbon since the aliphatic diazonium salts are unstable and the method using vinylic monomers does not permit the grafting of an aromatic carbon. Other differences are as follows. a) the invention makes it possible to graft unpolymerized monolayers whereas the organic layer obtained from vinyl monomers is necessarily a polymer; b) the method employing vinyl monomers involves the use of a polymerizable monomer, whereas the invention permits preforming of the polymer (which permits any changes of structure), place it in solution and then attach it by chemical reaction on an organic layer previously grafted to the metal surface; c) the invention permits preforming of a polymer possessing aminophenyl groups, transformation of these amino groups to diazonium salts then grafting the polymer thus functionalized, which is impossible in the case when vinyl monomers are used.

The organic films obtained by reduction of diazonium salts therefore reduce corrosion, as shown in Table 2; they are stable and withstand an anodic excursion of 75 mV.

Example II

Grafting of Zinc

The grafting of compounds 1, 5 and 10 was investigated on this metal, which is used in the production of galvanized sheets of mild steel for cars. The first and the last can easily be characterized, whereas diazonium salt 5 can provide hydrophobic protection of the metal against corrosion.

FIGS. 8a, 8b and 8c show the voltammogram of anthracene (in ACN+0.1M NBu$_4$BF$_4$) on a carbon electrode (8a), on a zinc electrode (8b) and finally of an electrode grafted at −1.1 V/SCE in a 2 mM solution of 10 in ACN+ 0.1M NBu$_4$BF$_4$, carefully rinsed in an ultrasonic tank and transferred to a solution containing only acetonitrile and the base salt (8c). The reduction of anthracene on zinc is reversible, as on carbon (Epc=−2.09 V/SCE, Epa=−1.93 V/SCE, °E=−2.01 V/SCE); the wave observed after grafting is located at −2.2 V/SCE, i.e. at a potential close to that of anthracene, on the other hand the wave has lost its reversibility almost entirely, for a reason that has yet to be elucidated. The presence of this wave on the grafted and carefully rinsed electrode clearly indicates the presence of a reducible group attached to the surface, and the similarity of the peak potentials means that this signal can be ascribed to an anthracenyl group grafted on the surface. The same phenomenon is observed if grafting takes place in dilute sulphuric acid.

The same phenomenon can be observed on grafting 4-nitrobenzene diazonium 1. FIGS. 9a and 9b show the reversible wave on the carbon of the nitrobenzene (° E=−1.23 V/SCE) and FIG. 9b shows a zinc electrode grafted with 4-nitrophenyl groups; this wave is wide and reversible, and its standard potential is identical to that of the nitrobenzene in solution on a carbon electrode. This clearly shows that grafting of 4-nitrophenyl groups has indeed taken place.

When a zinc electrode grafted with 4-butylphenyl groups (by reduction of 5) is placed in 0.1N $H_2SO_4$ solution and the potential is swept anodically (v=20 mV/s), the anode current observed is about 30% lower than on an untreated electrode, which points to a certain degree of protection of the zinc surface by the organic layer.

Example III

Grafting of Copper

Copper is oxidized electrochemically towards 0 V/SCE in ACN and towards −0.15 V/SCE in 0.1N $H_2SO_4$, therefore reduction of diazonium salts towards −0.5 V/SCE can be carried out in both media. FIGS. 10a, 10b and 11a, 11b show a copper electrode in a solution of anthraquinone and of nitrobenzene respectively, then the same electrode grafted with anthraquinone and nitrophenyl groups. The similarity of the potentials of the reversible systems is evidence of grafting of the copper.

Example IV

Grafting of Nickel

Figure 12:
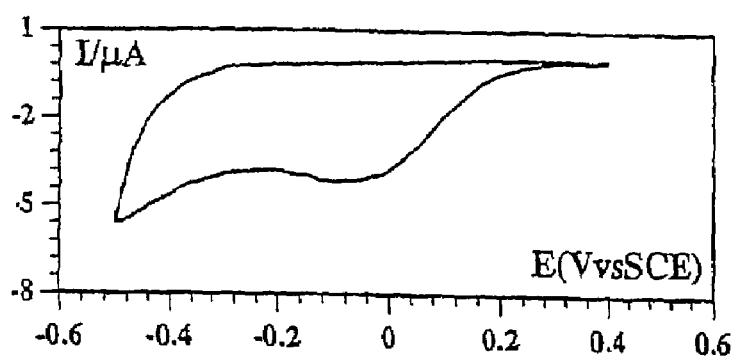
Figure 12:
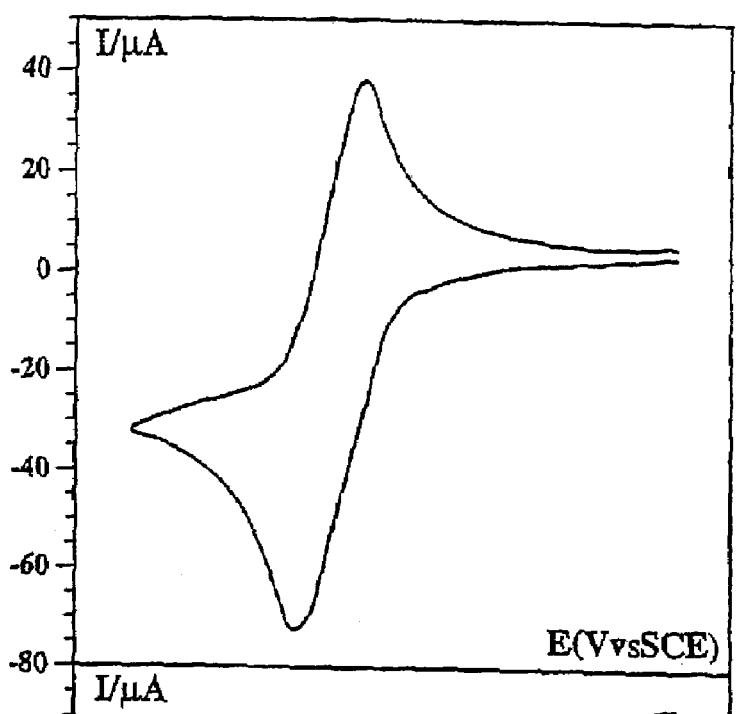
Figure 12:
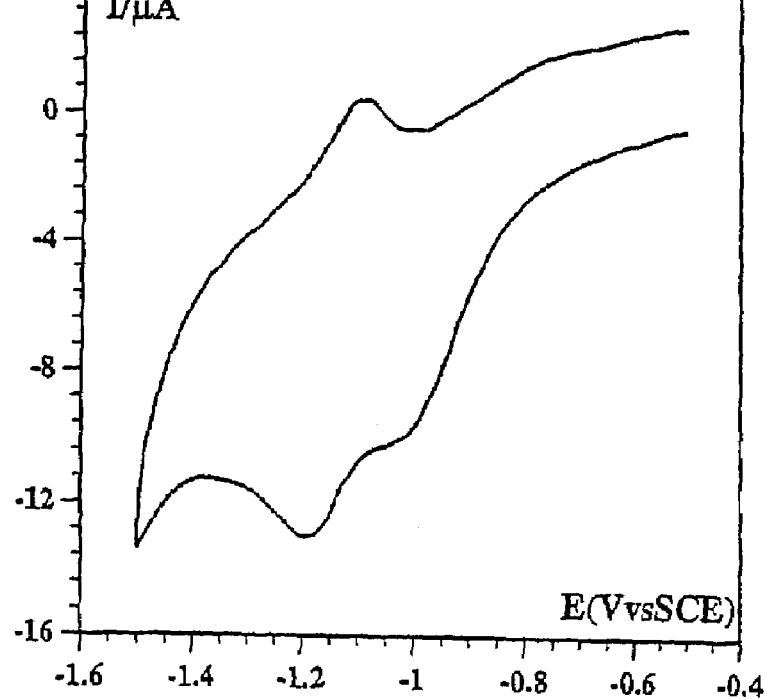

Nickel is oxidized towards +0.1 V/SCE in ACN and in 0.1N $H_2SO_4$. It is therefore possible to graft nickel electrodes towards −0.5 V/SCE. FIGS. 12a and 12b, similar to FIGS. 11a and 11b for copper, provide evidence of grafting on a nickel surface (on the grafted electrode a prewave is observed at a less negative potential than the wave of the 4-nitrophenyl group). The similarity of the potentials of the reversible systems indicates that grafting does indeed occur on nickel.

Example V

Grafting of Cobalt

Figure 13:
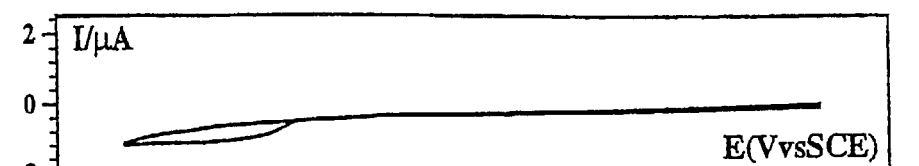
Figure 13:
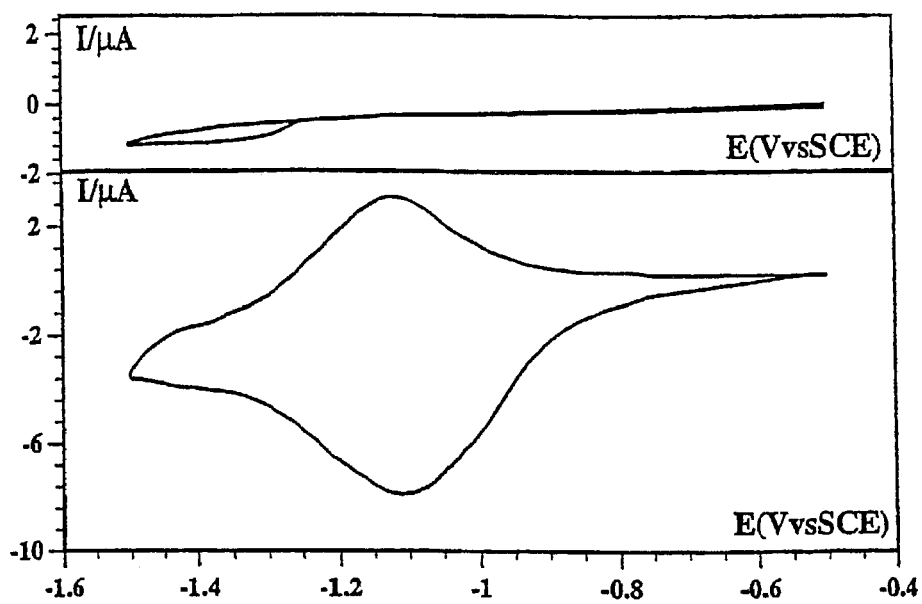

Cobalt is oxidized towards −0.2 V/SCE in ACN and towards −0.3 in 0.1N $H_2SO_4$. It is therefore possible to graft cobalt electrodes towards −0.5 V/SCE. FIGS. 13a and 13b, similar to FIGS. 11a, 11b (on copper) and 12a, 12b (on nickel), provide evidence of grafting on a cobalt surface.

Example VI

Grafting of Gold

On gold, which is difficult to oxidize, we can observe not only the wave of nitrobenzene (FIG. 14b) as in the preceding cases, but also the wave of reduction of diazonium towards +0.2 V/SCE (FIG. 14a) and finally the wave of the grafted 4-nitrophenyl group (FIG. 14c). Therefore grafting is carried out towards 0 V/SCE and the similarity of the potentials of the reversible systems of FIG. 14b and c clearly indicates grafting of the 4-nitrophenyl group on gold.

Example VII

Grafting of Platinum

The same curves can be observed on platinum. Grafting carried out towards 0 V/SCE can be confirmed by XPS as shown in Table 3: the nitrogen of the $NO_2$ group can be clearly seen at 406 eV which increases in glancing incidence, which clearly shows that it is on the outside of the layer and the almost total disappearance of the signal from platinum, masked by the organic layer.

TABLE 3

XPS spectra of a platinum surface grafted with 4-nitrophenyl groups.

| Elements | $C_{1s}$ | $O_{1s}$ | $N_{1s}$ total | $N_{1s}(NO_2)$ | $Pt_{4f}$ |
|---|---|---|---|---|---|
| Pt, bare | 26.8 | 16.3 | 0 | 0 | 56.8 |
| Pt, grafted  1) | 64.7 | 20.7 | 14.35 | 7.2 | 0.33 |
| 2) | 64.3 | 18.9 | 16.8 | 9.5 | 0.00 |

1) normal incidence,
2) glancing incidence

Example VIII

Grafting of Titanium

FIGS. 16a, 16b show the voltammogram of diazonium salt 1 (Epc=−0.2 V/SCE) on a polished titanium electrode (d=1 mm) in a solution of ACN+0.1M $NBu_4BF_4$; this irreversible wave disappears during the second sweep (FIG. 16a) just as was observed during grafting on carbon surfaces. Therefore it is possible to effect grafting towards −0.5 V/SCE. After careful rinsing in acetone in an ultrasonic tank, this electrode is then transferred to a solution containing only acetonitrile and the supporting electrolyte. We then observe the reversible voltammogram of the nitrophenyl group grafted on the surface at ° E=−1.11 V/SCE (FIG. 16b), very close to that of nitrobenzene itself on a carbon electrode. The wave of the grafted 4-nitrophenyl group is preceded by a prewave, similar to that observed on carbon, the origin of which has not yet been elucidated.

The XPS spectrum of the surface confirms grafting of the surface with 4-nitrophenyl groups.

TABLE 4

XPS spectra of a titanium surface grafted with 4-nitrophenyl groups.

| | Ti % 459 and 464 eV | C % | O % | N % |
|---|---|---|---|---|
| Polished titanium plate | 33.5 | 23.0 | 42.6<br>533 eV 2.7 | 401 eV 1.0<br>406 eV 0 |
| Grafted titanium plate | 14.9 | 42.0 | 38.4<br>533 eV 15.3 | 401 eV 1.6<br>406 eV 3.3 |

After grafting of the plate, a decrease of the signal from titanium is observed due to the presence of the organic layer, an increase of the carbon (on the polished plate, carbon comes from contaminants), an increase of the oxygen of the nitro group at 533 eV and appearance of the signal from nitrogen at 406 eV (3.3%), characteristic of the nitro group.

Example IX

Grafting of Stainless Steel

Figure 17:
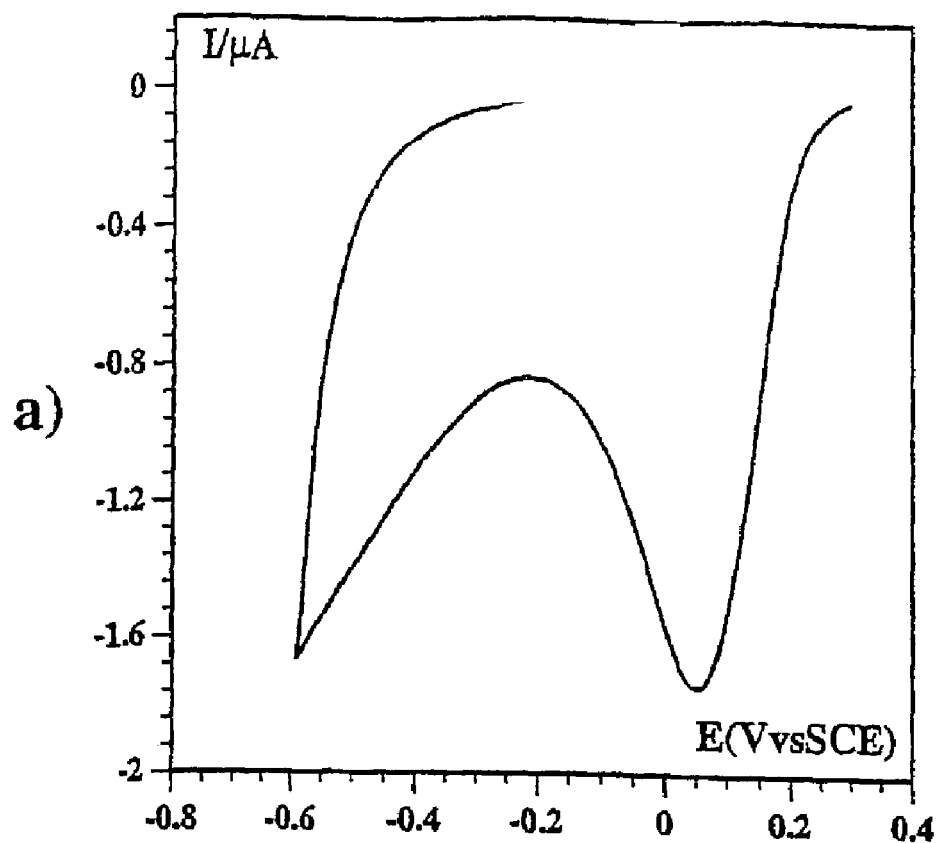
Figure 17:
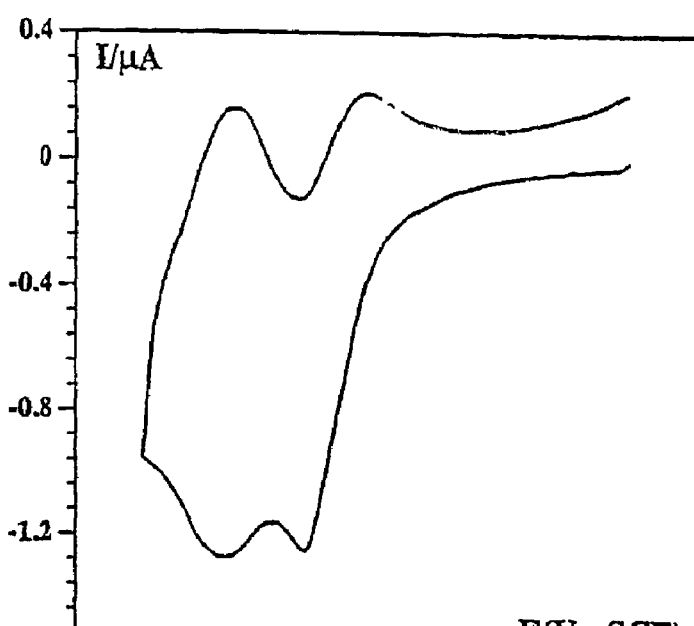
Figure 17:
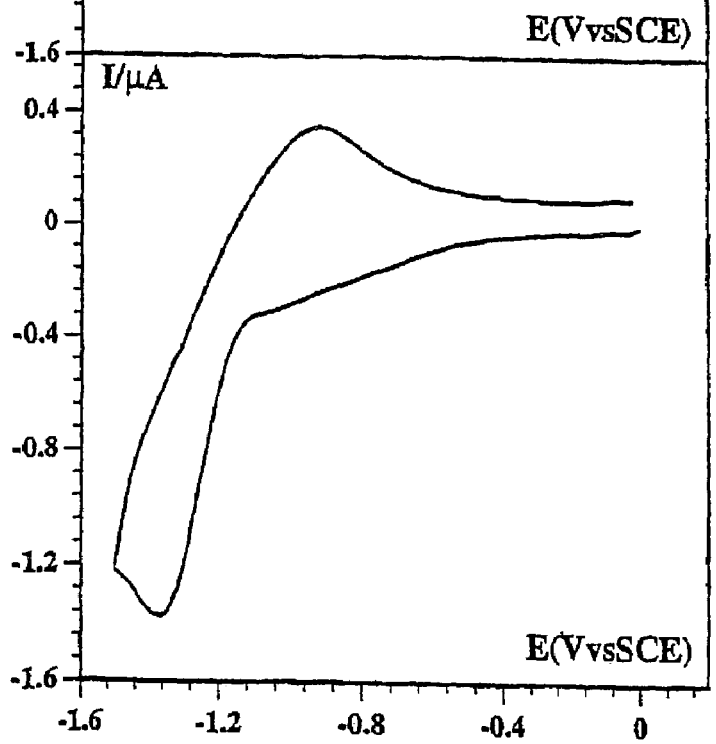

Stainless steel 316 is commonly used in prostheses. FIGS. 17a, 17b and 17c show, in the same way, the voltammogram of 1 on an electrode of stainless steel 316 (FIG. 17a), of the 4-nitrophenyl groups grafted by electrolysis in ACN+0.1M $NBu_4BF_4$+2 mM 1 at −0.2 V/SCE (FIG. 17b) and of nitrobenzene in the same solution (FIG. 17c). The XPS spectrum confirms the grafting.

TABLE 5

XPS spectra of a surface of stainless steel 316 L grafted with 4-nitrophenyl groups.

| | Fe % 707 and 710 eV | C % | O % | N % |
|---|---|---|---|---|
| Polished steel plate | 52.4 | 17.3 | 29.1<br>533 eV 3.6 | 401 eV 1.22<br>406 eV 0 |
| Grafted steel plate | 10.4 | 56.3 | 26.5<br>533 eV 12.3 | 401 eV 1.8<br>406 eV 5.0 |

After grafting of the plate, weakening of the signal from iron is observed, due to the organic layer, an increase of the signal due to the carbon, a strong increase of the signal from oxygen at 533 eV and of the signal from nitrogen at 406 eV, both of which are characteristic of the nitro group.

Cyclic voltammetry and XPS spectroscopy therefore both definitely confirm the existence of grafting on the stainless steel.

Comparative Examples

Comparative Example No. 1

Comparison of FIGS. 19 and 20 demonstrates the importance of the presence of a diazonium group.

FIG. 19 was obtained by sweeping the iron electrode between −0.6 V and −1.8 V in the presence of nitrobenzene (concentration 1 mM) in a solution of acetonitrile+base salt (0.1M $N_4BuF_4$). Then twenty sweeps are carried out between the same potentials. The method employed is the same as that used for grafting the diazonium salts.

Then, after rinsing the electrode for 5 minutes in acetone and 5 minutes in chloroform in an ultrasonic tank, a new test is carried out, consisting of bringing this electrode into contact with a solution containing only acetonitrile and the base salt, and not containing nitrobenzene, and recording the corresponding voltammogram (FIG. 20). No signal is observed: the nitrobenzene function has not been grafted on the electrode even though the method employed was the same as was used for grafting diazonium salts. This therefore shows that the diazonium group is essential for grafting.

Comparative Example No. 2

Experiments similar to those in Comparative Example No. 1 were carried out with p-nitrophenol (FIGS. 21 and 22).

FIG. 21B was obtained by sweeping the iron electrode between −0.6 V and −1.6 V in the presence of p-nitrophenol (concentration 1 mM) in a solution of acetonitrile+base salt (0.1M $N_4BuF_4$). Then twenty sweeps are carried out between the same potentials. The method used is the same as was used for grafting the diazonium salts. (FIG. 21A corresponds to the blank electrode).

Then, as previously, after rinsing the electrode for 5 minutes in acetone and 5 minutes in chloroform in an ultrasonic tank, a new experiment is carried out, consisting of placing this electrode in contact with a solution containing only acetonitrile and the base salt and not containing p-nitrophenol, and recording the corresponding voltammogram (FIG. 22). No signal is observed: the p-nitrophenol group has not been grafted on the electrode even though the same method was followed as was used for grafting the diazonium salts. This therefore shows that the diazonium group is essential for grafting.

Conclusion

It has been shown that the reduction of diazonium salts on metallic electrodes: iron, mild or stainless steel, zinc, copper, nickel, cobalt, titanium, gold or platinum, leads to grafting of the aryl group on the surface. The presence of these groups has been demonstrated by cyclic voltammetry, XPS, PMIRRAS, RBS and by capacitance measurements. These methods are based on different physical principles, so the convergence of the results demonstrates the reality of grafting. In all cases, this grafting withstands vigorous rinsing in an ultrasonic tank, indicating the existence of strong bonds, beyond simple adsorption. The measurements by cyclic voltammetry and RBS show that the molecular film is close to being a monolayer. These organic layers, especially those having an alkyl chain as substituent, present a cetain effectiveness against corrosion.

REFERENCES

[1] a) M. Delamar, R. Hitmi, J. Pinson, J. M. Savéant, *J. Am. Chem. Soc.* 1992, 114, 5883–5884; b) C. Bourdillon, M. Delamar, C. Demaille, R. Hitmi, J. Moiroux, J. Pinson, *J. Electroanal, Chem.* 1992, 336, 113–123; c) P. Allongue, M. Delamar, B. Desbat, O. Fagebaume, R. Hitmi, J. Pinson, J. M. Savéant, *J. Am. Chem. Soc.* 1997, 119, 201–207; d) M. Delamar, G. Desarmot, O. Fagebaume, R. Hitmi, J. Pinson, J. M. Savéant, *Carbon* 1997, 36, 801–807.

[2] a) Y. C. Liu, R. L. M.cCreery, *J. Am. Chem. Soc.* 1995, 117, 11254–11259; b) P. Chen, R. L. McCreery, *Anal. Chem.* 1996, 68, 3958–3965; K. Ray III, R. L. McCreery, *Anal. Chem.* 1997, 69, 4680–4687.

[3] a) M. D. Hawley in *Encyclopedia of Electrochemistry of the Elements, Organic Section*, Vol XIV (Eds.: A. J. Bard, H. Lund), Marcel Dekker, New York, 1980, pp 179–280; b) J. Pinson, J. M. Savéant, in Electroorganic Synthesis, Festschrift for Manuel Baizer (Eds.: R. D. Little, N. L. Weinberg), Marcel Dekker, New York, 1991, pp 29–44.

[4] (a) C. Saby, B. Ortiz, G. Y. Champagne, D. Bélanger, *Langmuir,* 1997, 13, 6805–6813; b) B. Ortiz, C. Saby, G. Y. Champagne, D. Bélanger, *Langmuir,* 1997, 13, 6805–6813.

[5] A. J. Downard, A. D. Roddick, *Electroanalysis,* 1995, 7, 376–378.

[6] A. J. Downard, A. D. Roddick, A. M. Bond, *Anal. Chim. Act.,* 1995, 317, 303–310.

[7] A. J. Downard, A. D. Roddick, *Electroanalysis,* 1997, 9, 693–698.

[8] J. A. Belmont, R. M. Amici, C. P. Galloway (Cabot Corp.) PCT WO 96 18,688 *[Chem. Abstr.* 1996, 125, 144212t].

[9] a) C. Henry de Villeneuve, J. Pinson, M. C. Bernard, P. Allongue, *J. Phys. Chem. B,* 1997, 101, 2415–2420; b) P. Allongue, Henry de Villeneuve, J. Pinson, F. Ozanam, J. N. Chazalviel, X. Wallart, *Electrochim. Act,* 1998, 43, 2791–2798.

[10] C. Brett, A. Brett, *Electrochemistry*, Oxford University Press, 1993.

[11] J. O'M. Bockris, B. Yang, *J. Electrochem. Soc.* 1991, 138, 2237–2252.

[12] a) T. Buffeteau, B. Desbat, J. M. Turlet, *Appl. Spectrosc.* 1991, 45, 380–389. b) D. Blaudez, T. Buffeteau, J. C. Cornut, B. Desbat, N. Escafre, M. Pezolat, M. Turlet *Appl. Spectrosc.* 1993, 47, 869–874.

[13] G. Varsanyi, S. Holly, L. Imre, *Spectrochim. Act.* 1967, 23A, 1205.

[14] a) M. M. Chehimi, M. Delamar, *J. Electron Spectrosc. Relat. Phenom.* 1998, 46, C1–C4; b) B. J. Linndberg, K. Hamrin, G. Johanson, U. Gelius, A. Fahlman, C. Nordling, K. Siegbahn, *Phys. Scri.,* 1970, 1, 286–298.

[15] A. J. Bard, L. J. Faulkner, *Electrochemical Methods,* J. Wiley, New York, 1993, p. 3345.

[16] J. M. O'M. Bockris, *Surface Electrochemistry,* Plenum, New York, 1993, pp. 745–852.

[17] K. Nozawa, N. Nishihara, K. Aramaki, *Corrosion Sci.,* 1997, 39, 1625–1639.

[18] M. Stem, A. L. Geary, *J. Electrochem. Soc.,* 1957, 104, 56–63.

[19] D. D. Macdonald, *J. Electrochem. Soc.,* 1978, 125, 1443–1449.

[20] I. Epelboin, M. Keddam, H. Takenouti, *J. Appl. Electrochem.,* 1972, 2, 71–79.

[21] C. Gabrielli, M. Keddam, *Electrochim Act.,* 1974, 19, 355–362.

[22] F. Mansfield, *J. Electrochem. Soc.,* 1973, 120, 515–518.

[23] G. Wranglen, *Introduction to Corrosion and Protection of Metals,* Institut för Metallskydd, Stockholm, 1972.

[24] G. Secayon, Y. Bouizem, C. Le Gressus, C. Reynaud, C. Boiziau, C. Juret, *Chem. Phys,.* 1982, 91, 506–510.

[25] J. Charlier, C. Bureau, G. Lecayon, *J. Electroanal. Chem.,* 1999, 465, 200–208 and References therein.

[26] G. Deniau, G. Lecayon, C. Bureau, J. Tanguy in *Protective Coatings and Thin Films* (Eds.: Y. Pauleau, P. B. Barna), Kluwer Academic, Amsterdam, 1997, pp. 265–278.

[27] B. S. Furniss, A. J. Hannaford, P. W. G. Smith, A. R. Tatchell, *Vogel's Textbook of Practical Organic Chemistry,* 5$^{th}$ ed., Longman, London, 1989, p. 920.

[28] S. H. Korzeniowski, A. Leopold, J. R. Beadle, M. F. Ahern, W. A. Sheppard, R. K. Khanna, G. W. Gokel, *J. Org. Chem.,* 1981, 46, 2153–2159.

[29] G. Balz, G. Schiemann, *Berichte,* 1927, 60, 1188–1190.

[30] J. Bartulin, G. Cardenas, H. Maturana, A. Ramirez, H. Zunza, *Bol. Soc. Quim. Chil. Quim.* 1981, 26, 1–5.

[31] A. Zinsou, M. Veber, H. Strzelecka, C. Jallabert, P. Forré, *New J. Chem.* 1993, 17, 309–313.

[32] D. Landolt, *Corrosion et Chimei de Surface des Metaux,* Presses Polytechniques et Universaires Romandes, Lausanne, 1997, p. 90.

The invention claimed is:

1. A metallic material, the surface of which is modified by bonding aromatic groups to said surface, optionally substituted by functional groups, the nature of the bond between the surface and the aromatic groups that modify said material being a carbon-metal bond of covalent type, and wherein said material withstands ultrasonic cleaning and said material is made by electrochemical reduction of a diazonium salt containing said aromatic group in the presence of said metallic material.

2. The metallic material according to claim 1, in which the nature of the bond between its surface and the aromatic groups that modify the latter is such that when an anode sweep is carried out starting from the corrosion potential of the metal forming the surface of the metallic material, there is at least one potential responsible for the dissolution of a detectable quantity of the aforesaid metal but which does not disrupt the aforesaid bond.

3. The metallic material according to claim 2, in which the nature of the bond between its surface and the aromatic groups that modify the latter is such that when an anode sweep is applied ranging from the corrosion potential to a potential that is more anodic by about 75 mV, to the metallic material whose surface is modified, rupture of the aforesaid bond does not occur, but there is dissolution of a detectable quantity of the metal forming the surface of the metallic material.

4. The metallic material according to claim 1, in which the aromatic group is a $C_6$–$C_{14}$ aromatic residue, optionally substituted by one or more functional substituents or a heteroaromatic residue of 4 to 14 atoms, optionally substituted by one or more functional substituents, comprising one or more heteroatoms selected from oxygen, nitrogen, sulphur or phosphorus.

5. The metallic material according to claim 1, in which the aromatic group has one or more substituents capable of reacting directly with a substrate, or one or more precursor substituents which, after transformation, are capable of reacting with a substrate, the said substrate being selected from the group comprising organic resins, biological molecules, chemical molecules or complexing agents.

6. The metallic material according to claim 1, in which the aromatic group has one or more substituents that are capable of reacting directly with a biological molecule and are selected from the group comprising $(CH_2)_n$—COOH, $(CH_2)_n$—$NH_2$, n being an integer comprised between 0 and 10, or one or more precursor substituents that are capable of reacting after transformation with a biological molecule and are selected from the group comprising $NO_2$, $N_2^+$, $(CH_2)_n$—CN, $(CH_2)_n$—CHO, $(CH_2)_n$—COOPr, Pr being a protective group, n being an integer comprised between 0 and 10.

7. The metallic material according to claim 1, in which the aromatic group has one or more substituents that are capable of reacting directly with functional organic molecules and are selected from the group comprising $NO_2$, $(CH_2)_n$—$CONH_2$, $(CH_2)_n$—CN, $(CH_2)_n$—CHO, $(CH_2)_n$—COOH, $(CH_2)_n$—$CH_2OH$, $(CH_2)_n$—$NH_2$, n being an integer comprised between 0 and 10, $SO_2H$, $SO_3H$, $SO_2R$, $SO_3R$, R being an aliphatic or aromatic carbon chain with 1 to 20 carbon atoms, or one or more precursor substituents that are capable of reacting after transformation with functional organic molecules and are selected from the group comprising $NO_2$, $(CH_2)_n$—$CONH_2$, $(CH_2)_n$—COOPr, Pr being a protective group, $(CH_2)_n$—NHP'r, $(CH_2)_n$—N (P'r)$_2$, $(CH_2)_n$—N=P''r, P'r and P''r being protective groups, $(CH_2)_n$—CN, $(CH_2)_n$—CHO, $(CH_2)_n$—COOH, $(CH_2)_n$—$CH_2OH$, n being an integer comprised between 0 and 10, $SO_2Pr$, $SO_3Pr$, Pr being a protective group selected from the meanings of R.

8. The metallic material according to claim 1, in which the aromatic group is selected from:

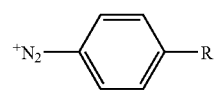

1 R = $NO_2$
2 R = I
3 R = COOH
4 R = $CH_3$
5 R = n-$C_4H_9$
6 R = n-$C_{12}H_{25}$
7 R = $OC_{12}H_{25}$
8 R = $OC_{16}H_{33}$

-continued

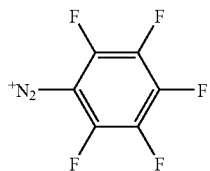

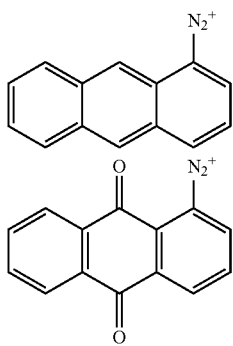

9. The metallic material according to claim 1, in which the metal is selected from pure metals or alloys, and in particular iron, nickel, platinum, gold, copper, zinc, cobalt, titanium, chromium, silver, stainless steels, titanium alloys, chromium-cobalt alloys, molybdenum, manganese, vanadium.

10. The metallic material according to claim 1, the surface of which is modified by an organic layer whose minimum thickness is about 10 Å.

11. A metallic material, the surface of which is modified by bonding aromatic groups to said surface, optionally substituted by functional groups, the nature of the bond between the surface and the aromatic groups that modify said material being a carbon-metal bond of covalent type, and wherein said material withstands ultrasonic cleaning and said material is made by electrochemical reduction of a diazonium salt containing said aromatic group in the presence of said metallic material and wherein the aromatic group has one or more substituents selected from the group comprising:

linear or branched aliphatic radicals of 1 to 20 carbon atoms, optionally containing one or more double or triple bonds, optionally substituted by the following radicals: carboxyl, $NO_2$, disubstituted protected amino, monosubstituted protected amino, cyano, diazonium, alkoxy of 1 to 20 carbon atoms, alkoxycarbonyl of 1 to 20 carbon atoms, alkylcarbonyloxy of 1 to 20 carbon atoms, vinyl optionally fluorinated or allyl, halogen atoms, aryl radicals optionally substituted by the following radicals: carboxyl, $NO_2$, disubstituted protected amino, monosubstituted protected amino, cyano, diazonium, alkoxy of 1 to 20 carbon atoms, alkoxycarbonyl of 1 to 20 carbon atoms, alkylcarbonyloxy of 1 to 20 carbon atoms, vinyl optionally fluorinated or allyl, halogen atoms, the following radicals: carboxyl, $NO_2$, disubstituted protected amino, monosubstituted protected amino, cyano, diazonium, alkoxy of 1 to 20 carbon atoms, alkoxycarbonyl of 1 to 20 carbon atoms, alkylcarbonyloxy of 1 to 20 carbon atoms, vinyl optionally fluorinated, halogen atoms.

12. A metallic material, the surface of which is modified by bonding aromatic groups to said surface, optionally substituted by functional groups, the nature of the bond between the surface and the aromatic groups that modify said material being a carbon-metal bond of covalent type, and wherein said material withstands ultrasonic cleaning and said material is made by electrochemical reduction of a diazonium salt containing said aromatic group in the presence of said metallic material, and wherein the aromatic group has one or more substituents that are capable of reacting directly with an organic resin and are selected from the group comprising allyl or vinyl groups, —$(CH_2)_n$—COOR, —$(CH_2)_n$—$CH_2$—OH, $(CH_2)_n$—$NH_2$, n being an integer comprised between 0 and 10, or one or more precursor substituents that are capable of reacting after transformation with an organic resin and are selected from the group comprising $NO_2$, $N_2^+$, $(CH_2)_n$—CN, $(CH_2)_n$—CHO, $(CH_2)_n$—COOPr, Pr being a protective group, $(CH_2)_n$—NHP'r, $(CH_2)_n$—N(P'r)$_2$, $(CH_2)_n$—N=P''r, P'r and P''r being protective groups, n being an integer comprised between 1 and 10.

13. A metallic material obtained by a method of modifying the surface of a metallic material, in order to obtain a metallic material according to claim 1, comprising attaching an aromatic group to the surface of the said material, by electrochemical reduction of a diazonium salt containing this aromatic group, by bringing the metallic material into contact with a solution of the diazonium salt in a solvent and by negatively polarizing the metallic material relative to an anode that is also in contact with the solution of the diazonium salt, and wherein the anode and the cathode may be separated from one another.

14. The metallic material according to claim 13, characterized in that electrochemical reduction takes place in the presence of an electrolyte, the anode and cathode compartments optionally being separated, the anode compartment containing the solvent and the electrolyte, and the cathode compartment containing the solvent, the electrolyte and the diazonium salt.

15. The metallic material according to claim 13, characterized in that the diazonium salt corresponds to the formula $ArN_2^+ X^-$, in which Ar represents the aromatic group and X represents an anion and in that this diazonium salt has a reduction potential that is less negative than the reduction potential of the free radical $Ar°$ corresponding to the aromatic group of the diazonium salt, the anion $X^-$ of the diazonium salt being selected advantageously from the halogens, the sulphates, the phosphates, the perchlorates, the tetrafluoroborates, the carboxylates, and the hexafluorophosphates.

16. The metallic material according to claim 13, characterized in that reduction is carried out by repetitive cyclic voltammetry in a potential range where the diazonium salts are reduced either by electrolysis at a potential that is more negative than the reduction potential of the diazonium salt, or at constant current.

17. The metallic material according to claim 13, characterized in that the concentration of diazonium salts is between $10^{-3}$ and $10^{-1}$ mol/l.

18. The metallic material according to claim 13, for the production by electrochemical means, of a metallic material whose surface is modified with aromatic amino groups, characterized in that the aromatic diazonium salt is substituted by a nitro radical and in that electrochemical reduction is maintained until there is reduction of the nitro radical to amino radical.

19. The metallic material according to claim 13, in which electrochemical reduction of the diazonium salt takes place in an aprotic solvent, selected from the group consisting of acetonitrile, dimethylformamide, dimethylsulphoxide and benzonitrile.

20. The metallic material according to claim 19, characterized in that the solution of the diazonium salt contains a supporting electrolyte consisting of a quaternary ammonium salt or a lithium salt, especially a tetraalkylammonium tetrafluoroborate.

21. The metallic material according to claim 13, in which electrochemical reduction of the organic diazonium salt takes place in a protic solvent in an acid medium.

22. The metallic material according to claim 21, characterized in that the protic solvent is selected from the group consisting of water, methanol, ethanol and their mixtures, or in that the protic solvent is mixed with an aprotic solvent, provided the resulting mixture has the characteristics of a protic solvent.

23. The metallic material according to claim 21, characterized in that the acid is selected from the group consisting of sulphuric, hydrochloric, nitric, nitrous, phosphoric and tetrafluoroboric acids.

24. The metallic material according to claim 21, characterized in that the pH of the solution is less than 2.

* * * * *